(12) United States Patent
Sun et al.

(10) Patent No.: US 12,333,669 B2
(45) Date of Patent: Jun. 17, 2025

(54) DATA PROCESSING METHOD AND APPARATUS, ELECTRONIC DEVICE, COMPUTER-READABLE STORAGE MEDIUM, AND COMPUTER PROGRAM PRODUCT

(71) Applicant: Tencent Technology (Shenzhen) Company Limited, Guangdong (CN)

(72) Inventors: Yuting Sun, Guangdong (CN); Chen Mo, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/206,920

(22) Filed: Jun. 7, 2023

(65) Prior Publication Data

US 2023/0326161 A1    Oct. 12, 2023

Related U.S. Application Data

(63) Continuation of application No. PCT/CN2022/107964, filed on Jul. 26, 2022.

(30) Foreign Application Priority Data

Jan. 5, 2022   (CN) .......................... 202210009571.6
Jan. 25, 2022  (CN) .......................... 202210086698.8

(51) Int. Cl.
  *G06T 19/20*    (2011.01)
  *G06F 3/04815*  (2022.01)
  (Continued)

(52) U.S. Cl.
  CPC .......... *G06T 19/20* (2013.01); *G06F 3/04815* (2013.01); *G06F 3/0482* (2013.01);
  (Continued)

(58) Field of Classification Search
  CPC ........... G06T 19/20; G06T 7/70; G06T 13/40; G06T 15/20; G06T 2200/24;
  (Continued)

(56) References Cited

U.S. PATENT DOCUMENTS 10,438,414 B2   10/2019   Bennett et al.
11,024,098 B1    6/2021   Drake et al.
(Continued)

FOREIGN PATENT DOCUMENTS

| CN | 108564643 A | 9/2018 |
| CN | 113709543 A | 11/2021 |
| WO | WO 2019/133045 A1 | 7/2019 |

OTHER PUBLICATIONS

International Search Report and Written Opinion of PCT/CN2022/107964, dated Jul. 26, 2022, 9 pages.
(Continued)

*Primary Examiner* — Thai Q Tran
*Assistant Examiner* — Jose M Mesa
(74) *Attorney, Agent, or Firm* — Crowell & Moring LLP

(57) ABSTRACT

A data processing method and apparatus, an electronic device, a non-transitory computer-readable storage medium, and a computer program product are provided. In response to a trigger operation on a multi-view video, a virtual video space scene is displayed corresponding to the multi-view video. Object data of a first object in the virtual video space scene is obtained in response to a scene editing operation on the virtual video space scene. The first object is an object that initiates the trigger operation on the multi-view video. A created video associated with the multi-view video is played on a virtual display interface. The created video is obtained by performing editing processing on the virtual video space scene based on the object data.

19 Claims, 27 Drawing Sheets

(51) Int. Cl.
  *G06F 3/0482* (2013.01)
  *G06Q 30/0601* (2023.01)
  *G06T 7/70* (2017.01)
  *G06T 13/40* (2011.01)
  *G06T 15/20* (2011.01)

(52) U.S. Cl.
  CPC ........... *G06Q 30/0641* (2013.01); *G06T 7/70* (2017.01); *G06T 13/40* (2013.01); *G06T 15/20* (2013.01); *G06T 2200/24* (2013.01); *G06T 2207/10016* (2013.01); *G06T 2207/20221* (2013.01); *G06T 2210/16* (2013.01); *G06T 2210/62* (2013.01); *G06T 2219/024* (2013.01); *G06T 2219/2024* (2013.01)

(58) Field of Classification Search
  CPC . G06T 2207/10016; G06T 2207/20221; G06T 2210/16; G06T 2210/62; G06T 2219/024; G06T 2219/2024; G06F 3/04815; G06F 3/0482; G06Q 30/0641
  See application file for complete search history.

(56) References Cited

U.S. PATENT DOCUMENTS

2018/0121069 A1    5/2018  DiVerdi et al.
2021/0166021 A1*  6/2021  Wang ................. G06Q 30/0633
2023/0074282 A1*  3/2023  Irie ........................ G11B 27/34

OTHER PUBLICATIONS

Office Action issued in Japanese Patent Application No. 2024-510713 dated Jan. 30, 2025, w/English translation, 8 pages.

* cited by examiner

DATA PROCESSING METHOD AND APPARATUS, ELECTRONIC DEVICE, COMPUTER-READABLE STORAGE MEDIUM, AND COMPUTER PROGRAM PRODUCT

RELATED APPLICATION

The present application is a continuation of PCT application PCT/CN2022/107964, which claims priority to Chinese Patent Application No. 202210009571.6 filed on Jan. 5, 2022 and Chinese Patent Application No. 202210086698.8 filed on Jan. 25, 2022, which are hereby incorporated by reference in their entireties.

FIELD OF THE TECHNOLOGY

The present subject matter relates to the field of computer technologies, and in particular, to a data processing method and apparatus, an electronic device, a non-transitory computer-readable storage medium, and a computer program product.

BACKGROUND

Film and television is an art form that takes a copy, a magnetic tape, a photographic film, a memory, or the like as a carrier and projection to a projection screen or a screen as a purpose, thereby implementing visual and auditory appreciation. It is a comprehensive form of modern arts, and includes films, television dramas, programs, animations, and other content.

A video produced based on a virtual reality (VR) technology is used as an example. An electronic signal generated from data in real life by using a computer technology is combined with various output devices to be converted into a phenomenon that a user can feel, to support immersive experience of the user in a watching process.

However, in a conventional video playing scene, content presented by a video is fixed and excessively single. In the related art, there is no solution to efficiently perform secondary editing on a single video to obtain a personalized video meeting a user requirement.

BRIEF SUMMARY

The examples of the present subject matter provide a data processing method and apparatus, an electronic device, a non-transitory computer-readable storage medium, and a computer program product, which may implement lightweight fusion of an audience to video content by using a small quantity of data processing resources, improve human-computer interaction efficiency, and enrich video presentation modes and interaction modes.

An example of the present subject matter provides a data processing method. The method is performed by a computer device, and includes:

displaying, in response to a trigger operation on a multi-view video, a virtual video space scene corresponding to the multi-view video;

obtaining object data of a first object in the virtual video space scene in response to a scene editing operation on the virtual video space scene, the first object is an object that initiates the trigger operation on the multi-view video; and playing a created video associated with the multi-view video on a virtual display interface, the created video is obtained by performing editing processing on the virtual video space scene based on the object data.

An example of the present subject matter provides a data processing apparatus, including:

a first response module, configured to display, in response to a trigger operation on a multi-view video, a virtual video space scene corresponding to the multi-view video;

a second response module, configured to obtain object data of a first object in the virtual video space scene in response to a scene editing operation on the virtual video space scene, the first object is an object that initiates the trigger operation on the multi-view video; and a video playing module, configured to play a created video associated with the multi-view video on a virtual display interface, the created video is obtained by performing editing processing on the virtual video space scene based on the object data.

An example of the present subject matter further provides a computer device, including a processor, a memory, and a network interface.

The processor is connected to the memory and the network interface. The network interface is configured to provide a data communication function. The memory is configured to store a computer program. The processor is configured to invoke the computer program to perform the method in the examples of the present subject matter.

An example of the present subject matter provides a non-transitory computer-readable storage medium. The computer-readable storage medium stores a computer program. The computer program is suitable for a processor to load and execute to implement the method in the examples of the present subject matter.

An example of the present subject matter provides a computer program product or computer program. The computer program product or computer program includes computer instructions. The computer instructions are stored in a non-transitory computer-readable storage medium. A processor of a computer device reads the computer instructions from the computer-readable storage medium. The processor executes the computer instructions to enable the computer device to perform the method in the examples of the present subject matter.

In the examples of the present subject matter, the first object may view the virtual video space scene from any view in the virtual video space scene. The first object may perform secondary creation on the multi-view video according to a creation idea of the first object, to obtain the created video. In this way, video presentation modes and interaction modes may be enriched. In addition, the created video in which the first object participates may be obtained without secondary shooting, so that lightweight fusion of an audience to video content is implemented by using a small quantity of data processing resources. This improves human-computer interaction efficiency and enriches the video presentation modes and the interaction modes while saving data processing resources.

BRIEF DESCRIPTION OF THE DRAWINGS

To describe the technical solutions in the examples of the present subject matter or in the related art more clearly, the following briefly describes the accompanying drawings required to be used for describing the examples or the related art. Apparently, the accompanying drawings in the following descriptions show merely some examples of the present subject matter, and a person of ordinary skill in the art may still derive other drawings from the accompanying drawings without creative efforts.

DETAILED DESCRIPTION

Figure 1:
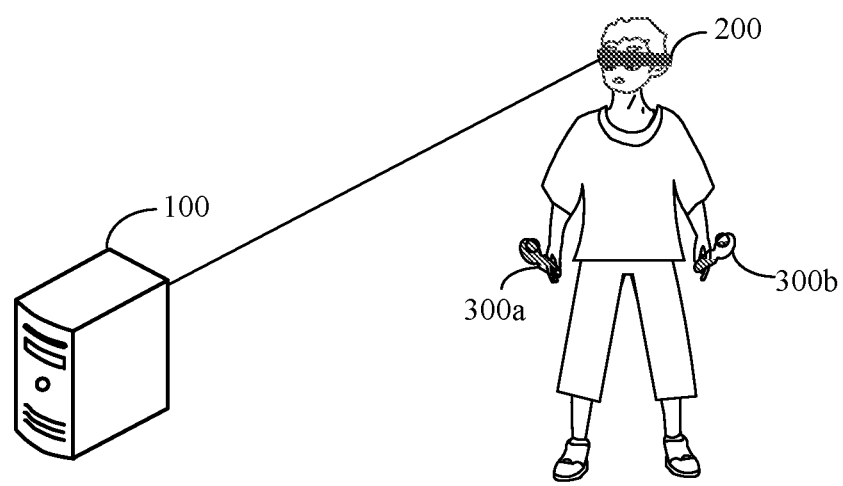
FIG. 1 is a schematic diagram of a system architecture according to an example of the present subject matter.

The following clearly and completely describes the technical solutions in the examples of the present subject matter with reference to the accompanying drawings in the examples of the present subject matter. Clearly, the described examples are merely some but not all of the examples of the present subject matter. All other examples obtained by a person of ordinary skill in the art based on the examples of the present subject matter without creative efforts shall fall within the protection scope of the present subject matter.

Artificial intelligence (AI) is a theory, method, technology, and application system of simulating, extending, and developing human intelligence using digital computers or machines controlled by digital computers to perceive environments, acquire knowledge, and obtain optimal results using the knowledge. In other words, AI is a comprehensive technology in computer science and attempts to understand the essence of intelligence and produce a new intelligent machine that can react in a manner similar to human intelligence. AI is to study design principles and implementation methods of various intelligent machines, to endow the machines with functions of perception, reasoning, and decision-making.

The AI technology is a comprehensive discipline, and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a voice processing technology, a natural language processing technology, and machine learning/deep learning.

The CV technology is a science that studies how to use a machine to "see", and furthermore, that performs machine vision processing such as recognition and measurement on a target by using a camera and a computer instead of human eyes and further performs graphic processing, so that the computer processes the target into an image more suitable for human eyes to observe or an image transmitted to an instrument for detection. As a scientific discipline, CV studies related theories and technologies and attempts to establish an AI system capable of obtaining information from images or multidimensional data. The CV technology usually includes image processing, image recognition, semantic image understanding, image retrieval, optical character recognition (OCR), video processing, semantic video understanding, video content recognition, three-dimensional (3D) object reconstruction, a 3D technology, VR, augmented reality (AR), simultaneous localization and mapping, and other technologies.

The VR technology integrates computer, electronic information, and simulation technologies. A basic implementation manner of the VR technology is that a computer simulates a virtual environment, thereby immersing a person in the environment. As the name implies, VR is a combination of virtuality and reality. Theoretically, the VR technology may be a computer simulation system capable of creating and experiencing a virtual world, which generates a simulated environment by using a computer, thereby immersing a user in the environment. The VR technology combines an electronic signal generated from data in real life by using a computer technology with various output devices, and converts the electronic signal into a phenomenon that the user can feel. The phenomenon cannot be seen directly but is a world simulated from the reality by using the computer technology, and thus is referred to as VR. The VR technology is a combination of the simulation technology and various technologies such as computer graphics, a human-computer interface technology, a multimedia technology, a sensing technology, and a network technology, and is a challenging cross-technology frontier discipline and research field. The VR technology mainly includes the simulated environment, an action, perception, a sensing device, and other aspects. The simulated environment includes a real-time dynamic 3D panoramic image and sound generated by the computer.

The solutions provided in the examples of the present subject matter relate to the field of VR technology in the CV technology in AI, and are specifically described by using the following examples.

FIG. 1 is a diagram of a system architecture according to an example of the present subject matter. As shown in FIG. 1, the system architecture may include a data processing device 100, a virtual display device 200, and a controller (for example, FIG. 1 uses a controller 300a and a controller 300b as examples, and certainly, the quantity of controllers may be one or more, that is, the controller may include the controller 300a and/or the controller 300b). Both the controller and the virtual display device 200 may be in communication connection to the data processing device 100. A connection manner for the communication connection is not limited. A wired communication mode may be used for direct or indirect connection, a wireless communication mode may be used for direct or indirect connection, or another manner may be used. This is not limited herein in this example of the present subject matter. In addition, when the data processing device 100 is integrated into the virtual display device 200, the controller 300a and the controller 300b may be directly connected to the virtual display device 200 with a data processing capability in a wired or wireless manner. The virtual display device 200 may be a VR device, a computer device with an AR function, or a computer device with a mixed reality (MR) function.

As shown in FIG. 1, the controller (that is, the controller 300a and/or the controller 300b) may transmit a control instruction to the data processing device 100. The data processing device 100 may generate related animation data according to the control instruction, and transmit the animation data to the virtual display device 200 for displaying. The virtual display device 200 may be used for being worn on the head of a user, for example, a VR headset, and displaying a virtual world to the user (the virtual world may be a world that is developed or formed by using a computer technology, an Internet technology, a satellite technology, and human awareness potential, that is independent of and connected with a real world and similar to the earth or the universe, and that the user enters in a form of awareness by using a VR device). The controller may be a handle in a VR system, a motion sensing device worn on the user, or an intelligent wearable device (for example, a smart band). The data processing device 100 may be a server or terminal with a data processing capability. The server may be an independent physical server, a server cluster or distributed system including a plurality of physical servers, or a cloud server providing a basic cloud computing service such as a cloud database, a cloud service, cloud computing, a cloud function, cloud storage, a network service, cloud communication, a middleware service, a domain name service, a security service, a content delivery network (CDN), or a big data and artificial intelligence platform. The terminal may be an intelligent terminal with a data operation capability, for example, a smartphone, a tablet computer, a laptop computer, a desktop computer, a palmtop computer, or a mobile Internet device (MID).

The virtual display device 200 and the data processing device 100 may be independent devices respectively, or may be integrated (that is, the data processing device 100 is integrated into the virtual display device 200). An example in which a data processing method provided in the present subject matter is implemented by a control device is used to describe subsequent examples in detail, so as to understand the data processing method provided in the examples of the present subject matter better. The control device may also be referred to as a VR device. The VR device is a device integrating the virtual display device 200 and the data processing device 100. The VR device may be connected to the controller for data processing, or may provide a virtual display interface to display a video picture corresponding to data.

The examples of the present subject matter provide the data processing method. A multi-view video may be selected in response to a trigger operation performed by a first object on the multi-view video. The VR device may display a virtual video space scene corresponding to the multi-view video in response to the trigger operation performed by the first object on the multi-view video. The virtual video space scene is a simulated environment generated by the VR device, and may provide visual, auditory, touch, and other simulations for the first object to provide immersive experience for the first object. The first object wearing the VR device may feel that the first object is in the virtual video space scene. The first object perceives the virtual video space scene as a 3D space scene. The VR device may present a virtual video space scene in a view of the first object. When the first object walks, the view of the first object may change. The VR device may obtain a real-time view of the first object, and present a virtual video space scene in the real-time view of the first object to the first object, so that the first object feels that the first object walks in the virtual video space scene. In addition, the first object may interact with the VR device for the virtual video space scene.

Figure 2A:
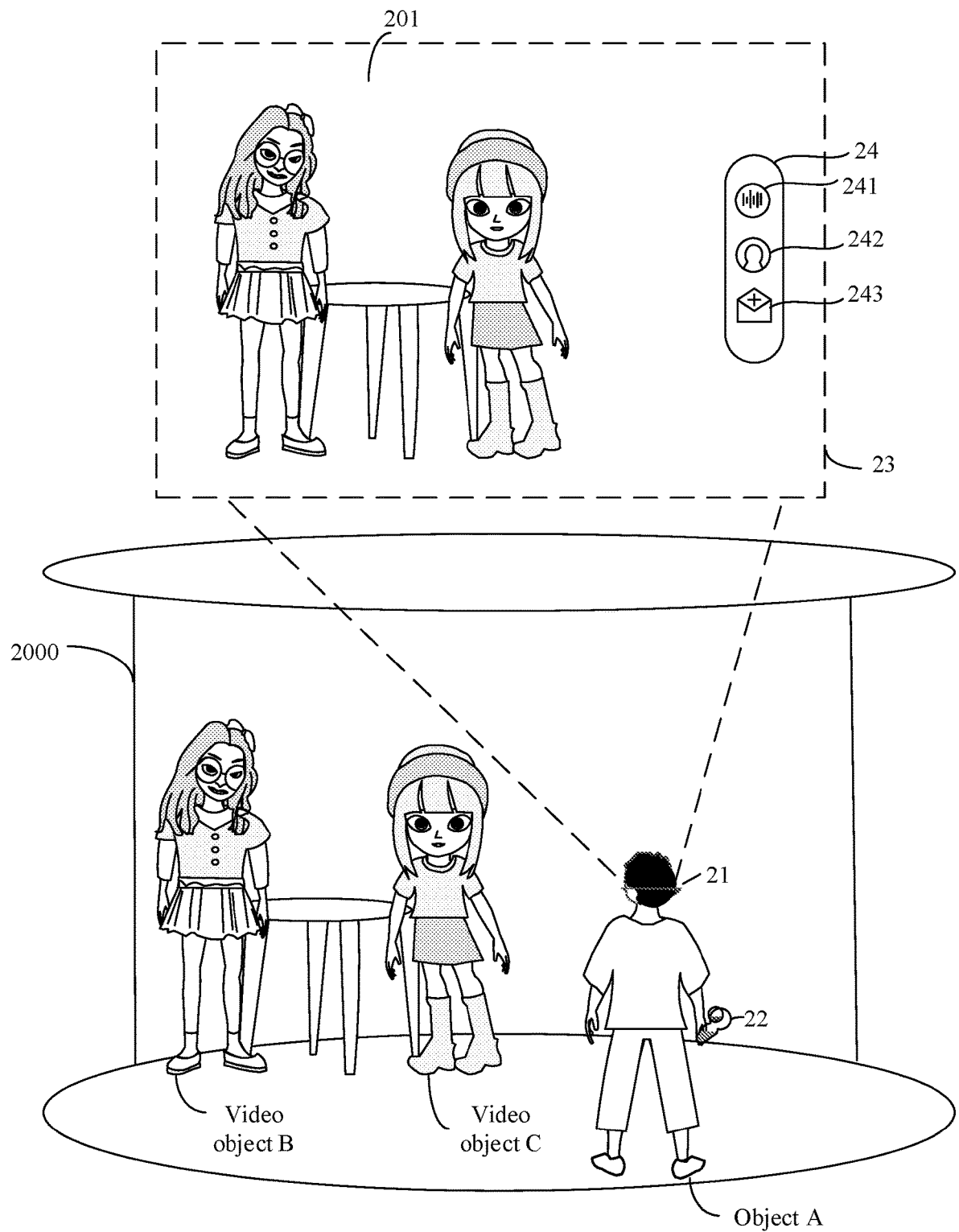
FIG. 2a is a schematic diagram of a VR-based scene creation scene according to an example of the present subject matter.

FIG. 2a is a schematic diagram of a VR-based scene creation scene according to an example of the present subject matter. An implementation process of the present subject matter processing scene may be implemented based on the VR device. As shown in FIG. 2a, it is assumed that the first object for example, an object A) wears a VR device 21 (that is, the device integrating the virtual display device 200 and the data processing device 100 in FIG. 1) and a VR handle 22 (that is, the controller in FIG. 1). The VR device 21 may enter, in response to a trigger operation performed by the object A on a multi-view video, a virtual video space scene 2000 corresponding to the multi-view video. The multi-view video may be a video browsed in a six degrees of freedom tracking (6DOF) manner. The multi-view video may include virtual video pictures in a plurality of different views. For example, the multi-view video may include a target virtual video picture in a target view. The target virtual video picture may be obtained by an image acquisition device (for example, a camera) from a real space scene in the target view. The VR device may output the target virtual video picture on a virtual display interface 23 by using a 3D display technology, thereby obtaining a simulated real space scene in the target view. The simulated real space scene in the target view is a virtual video space scene in the target view. As shown in FIG. 2a, the VR device 21 may display a virtual video picture 201 on the virtual display interface 23. In the virtual video picture 201, a video object B corresponding to a character Xiaojia is talking with a video object C corresponding to a character Xiaoyi. The virtual video picture 201 may be a video picture of the virtual video space scene 2000 in a default view. The default view may be a master shot view, that is, an ideal shot view for a director. The VR device 21 may present the virtual video picture 201 to the object A by using the 3D display technology, and the object A may be immersed in a scene that the video object B and the video object C are talking with each other standing not far away in front of the object A. The object A sees a virtual video space scene 2000 in the default view. In the perception of the object A, it is considered that the virtual video space scene 2000 as a 3D real space scene and the object A may walk freely in the virtual video space scene 2000, so that a viewing angle of the object A for the virtual video space scene 2000 changes as the object A walks. To immerse the object A in the virtual video space scene 2000, the VR device 21 may obtain a position of the object A in the virtual video space scene 2000 to determine a view of the object A, then obtain a virtual video picture of the virtual video space scene 2000 in the view of the object A, and then display the virtual video picture by using the virtual display interface. In this way, the object A may see a virtual video space scene 2000 in the view of the object A, so that immersive experience is provided for the object A. That is, the object A perceives that the object A is currently in the virtual video space scene 2000, and may walk freely to view virtual video space scenes 2000 in different views. In addition, in addition to implementing visual simulation for the object A by using the 3D display technology, the VR device 21 may generate an electronic signal by using the computer technology, and combine the electronic signal with various output devices to implement other perceptual simulation for the object A. For example, the VR device 21 may simulate a sense of direction for a sound by using a surround sound technology, that is, by adjusting volume and other parameters of different channels, thereby bringing real auditory experience to the object A. This is not limited in this example of the present subject matter.

By using the VR device 21, the object A may be immersed in a plot of the multi-view video in a first view in the virtual video space scene corresponding to the multi-view video. When the object A has another creative idea about the plot of the multi-view video, the object A may perform scene creation, for example, dubbing and performing, in the virtual video space scene 2000 corresponding to the multi-view video by using the VR device 21, and the object A may further invite a friend to perform scene creation on the multi-view video. The VR device 21 may further display a scene creation bar 24 independently on the virtual display interface 23. As shown in FIG. 2a, the object A may see the scene creation bar 24 displayed in front in a floating manner. The scene creation bar 24 may include a dubbing control 241, a performance control 242, and an object invitation control 243. By using the VR handle 22, the object A may trigger a scene editing operation on the virtual video space scene 2000, that is, a trigger operation on a specific control in the scene creation bar 24. Then, the object A may modify the plot of the multi-view video according to the creative idea of the object A, to obtain, by using the VR device 21, a created video generated by performing plot modification on the multi-view video. For example, the object A may trigger the dubbing control 241 to add a voice-over to the multi-view video or modify lines of a specific character. Alternatively, the object A may trigger the performance control 242 to add a new character to the multi-view video or replace a specific character in video objects for a creative performance. Alternatively, the object A may trigger the object invitation control 243 to invite a friend to perform plot creation on the multi-view video. After the VR device 21 responds to the scene editing operation (that is, the foregoing operation of triggering a specific control in the scene creation bar 24) performed by the object A on the virtual video space scene 2000, the object A may perform corresponding scene creation, for example, dubbing and performing, on the virtual video space scene 2000. The VR device 21 may obtain object data of the object A in the virtual video space scene 2000. Then, the VR device 21 may fuse the obtained object data and the virtual video space scene 2000 to obtain the created video. For implementation processes of obtaining the object data and fusing the object data, refer to specific descriptions in the following examples.

Figure 2B:
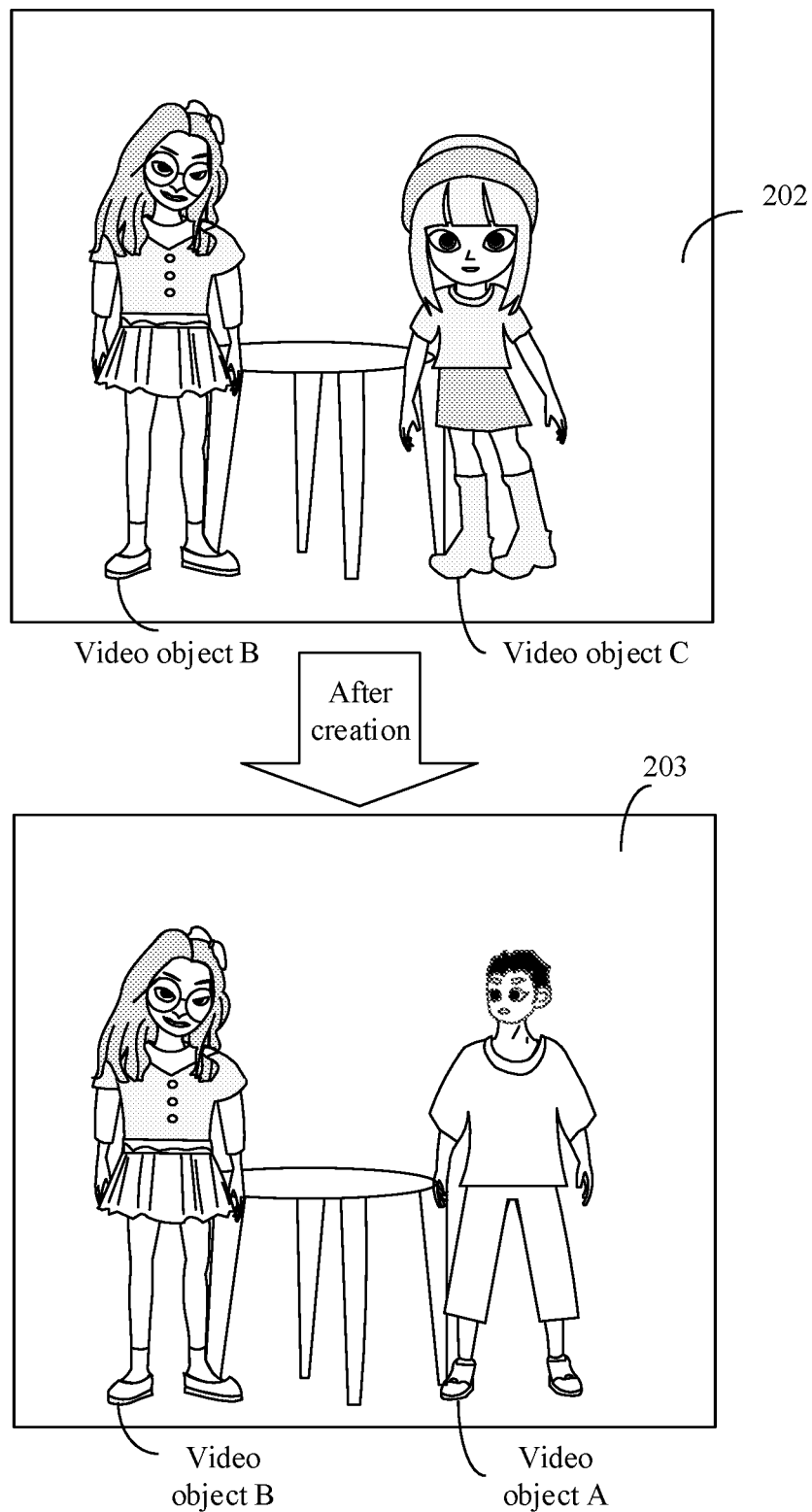
FIG. 2b is a schematic diagram of video comparison according to an example of the present subject matter.

FIG. 2b is a schematic diagram of video comparison according to an example of the present subject matter. As shown in FIG. 2b, in a virtual video picture 202 at a moment A in the multi-view video, the video object B corresponding to the character Xiaojia is talking with the video object C corresponding to the character Xiaoyi. If the object A likes the video object B very much, and hopes that it is the object A talking with the video object B, the object A may play the character Xiaoyi instead of the video object C. The object A may trigger the performance control 242 in the scene shown in FIG. 2a, and then perform in the virtual video space scene 2000, that is, talk with the video object B in the virtual video space scene 2000. The VR device 21 may obtain object data of the object A when talking with the VR object B. The object data may be data of the object A such as a skeleton, an action, an expression, a figure, and a position in the virtual video space scene. The VR device 21 may create a video object A with object data, then cancel displaying of the video object C in the multi-view video, and fuse the video object A into a multi-view video from which the video object C is filtered, to obtain a created video. Thus, the object A becomes an actor of the character Xiaoyi through creation of the object A in the virtual video space scene 2000.

It may be understood that the object data is involved in a specific implementation of the present subject matter. When the foregoing examples of the present subject matter are applied to a specific product or technology, a license or consent of a user is required to be obtained, and collection, use, and processing of the related data are required to comply with related laws and regulations and standards of related countries and regions.

In this example of the present subject matter, after the object A enters the virtual video space scene by using the VR device, the VR device may display the virtual video space scene corresponding to the multi-view video to immerse the object A in the virtual video space scene, obtain the object data of the object A about dubbing and performing in the virtual video space scene in response to a creation operation performed by the object A on the virtual video space scene, and then fuse the object data and the virtual video space scene to obtain the created video. This can efficiently implement secondary creation performed by the object A on the multi-view video, and enrich presentation modes of the multi-view video and interaction modes.

Figure 3:
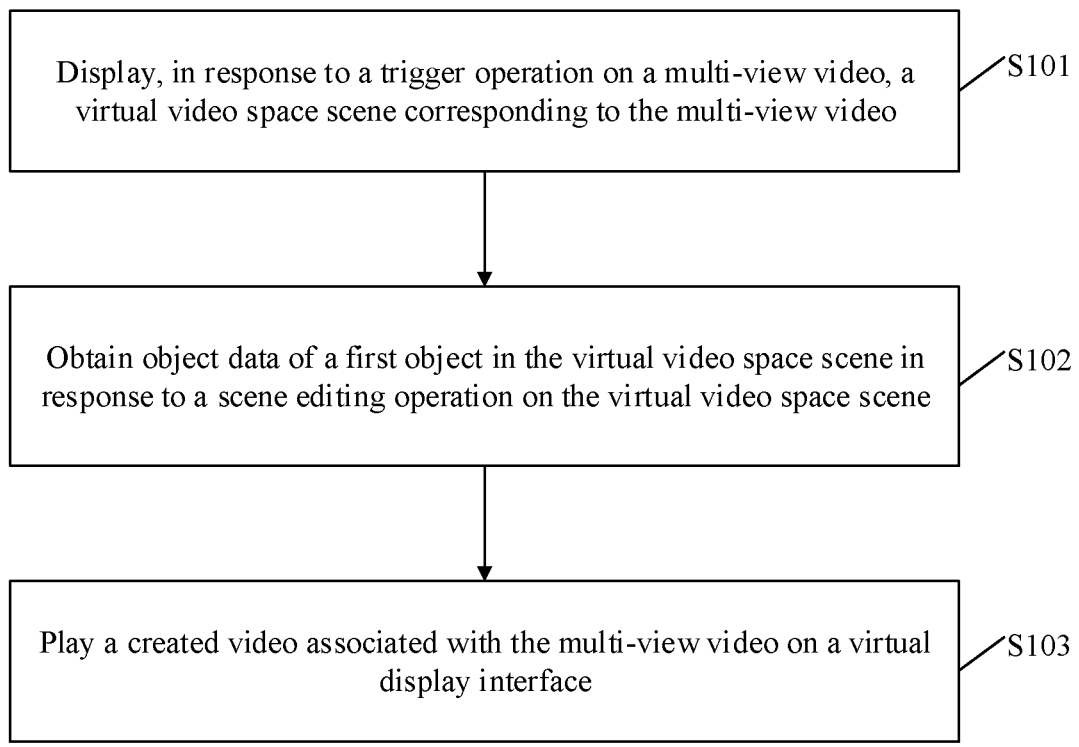
FIG. 3 is a schematic flowchart of a data processing method according to an example of the present subject matter.

FIG. 3 is a schematic flowchart of a data processing method according to an example of the present subject matter. The data processing method may be performed by a VR device. For ease of understanding, an example in which the method is performed by the VR device is used for description in this example of the present subject matter. The data processing method may include at least the following step S101 to step S103.

Step S101: Display, in response to a trigger operation on a multi-view video, a virtual video space scene corresponding to the multi-view video.

The multi-view video may be a created video browsed in a 6DOF manner, for example, a film, a television drama, or a musical. The multi-view video may include a virtual video picture of a real space scene in at least one specific view. The VR device displays, on a virtual display interface, a target virtual video picture in a target view in a 3D form. The target view is a view obtained according to a real-time position and a real-time posture of a first object. For example, the first object currently stands facing the south in a state of looking upwards, and a view indicated by the situation that the first stands facing the south in the state of looking upwards is the target view. Alternatively, the target view may be obtained in response to a view selection operation of the first object. The first object wearing the VR device may see a virtual video space scene in the target view. When the VR device switches to display virtual video pictures in different views by using the virtual display interface, the first object may see virtual video space scenes in different views. The virtual video space scene is not a real space scene but simulates the real space scene. An object, an environment, a voice, or the like in the virtual video space scene may be generated by the VR device, or a combination of virtuality and reality. That is, some objects, environments, voices, or the like are generated by the VR device, and some objects, environments, voices, or the like exist in the real space scene in which the first object is. When the first object wears the VR device, the VR device combines an electronic signal generated by using a computer technology with various output devices to obtain the virtual video space scene corresponding to the multi-view video, and the first object may see a virtual video space scene in a view of the first object. In the perception of the first object, there is no difference between the virtual video space scene and the real space scene, that is, the first object may consider the first object as being in the real space scene. For example, in the virtual video space scene 2000 shown in FIG. 2a, in the perception of the object A, the object A is in the virtual video space scene 2000, and the object A may experience plot development of the multi-view video in the first view. It is to be noted that the first object perceives that the first object is in the virtual video space scene, but the first object "sees" the virtual video space scene in the view of the first object, and what the first object actually sees is the virtual video picture on the virtual display interface of the VR device.

A possible shooting and production process of the multi-view video may be as follows: shooting a real environment (that is, the real space scene) corresponding to the multi-view video by using a panorama camera to obtain point cloud data of the entire scene, then performing fitting modeling by using the point cloud data, and performing multi-scene model fusion optimization based on a fitting modeling result. In addition, complete character scanning modeling is performed on an actor in a special studio to complete producing a virtual object (that is, a video object corresponding to the actor). Moreover, during shooting of the multi-view video, the actor needs to be dressed in green with markers and capturing points to perform in the real environment corresponding to the multi-view video. Then, complete recording and capturing is performed on the actor by using a camera group of a film director including a main camera and a plurality of cameras. Captured multi-angle data is merged, thereby obtaining real-time action data and expression data of each actor. The produced video object is put in an optimized multi-scene model. Then, a body skeleton and an expression of the video object are driven by using the real-time action data and expression data. Lighting and shadow effects are added to the modeled real environment to finally obtain the multi-view video. It is to be noted that before complete character scanning and complete recording and capturing are performed on the actor, a permission of the actor is required to be obtained. The obtained action data and expression data is used only for producing the multi-view video not for other purposes such as data analysis.

Step S102: Obtain object data of the first object in the virtual video space scene in response to a scene editing operation on the virtual video space scene.

The first object is an object that initiates the trigger operation on the multi-view video. When the multi-view video is played, the first object may trigger the scene editing operation on the virtual video space scene. The VR device may obtain, in response to the scene editing operation, the object data of the first object during a performance for scene creation in the virtual video space scene. Scene creation may include dubbing, performing, object invitation, and the like. The object data may include voice data, posture data, figure data, position data, and other data. The voice data corresponds to a voice of the first object. The posture data corresponds to an action form of the first object. The figure data corresponds to an appearance of the first object. The position data corresponds to a position of the first object in the virtual video space scene. In a possible implementation in which the VR device obtains the object data, the VR device may include a plurality of real-time capturing cameras and an audio recording control. The camera may shoot the first object in real time from different views to obtain shot pictures in different views. The VR device may fuse the plurality of pictures, and then calculate real-time object data of the first object, including the posture data and the figure data of the first object. The posture data may further include body skeleton data and expression data of the first object. The VR device may determine, according to the figure data, a figure of a performance object associated with the first object, determine a real-time action of the performance object according to the body skeleton data, and determine a real-time expression of the performance object according to the expression data. The audio recording control may obtain the voice data of the first object in real time. When obtaining the object data of the first object, the VR device is required to be authorized by the first object. The obtained object data is used only for producing a created video. For example, the voice data in the object data is used only for presenting the voice of the first object in the created video. The posture data is used only for presenting an action and an expression of a video object corresponding to the first object in the created video. The figure data is used only for presenting a figure and clothing of the video object corresponding to the first object in the created video. The data is not used for other purposes such as data analysis. So is the object data obtained in subsequent examples of the present subject matter, and elaborations are omitted.

In the perception of the first object, the first object is in the virtual video space scene, and the first object may conduct an action such as walking, speaking, laughing, or crying in the virtual video space scene. Therefore, the first object may experience performing for scene creation in a plot of the multi-view video in the virtual video space scene. Performing for scene creation means that the first object may play a character the first object likes, that is, present lines, an action, and an expression instead of a video object corresponding to the character in the virtual video space scene to promote the plot together with another video object in the virtual video space scene or interact with another video object in which the first object is interested to play opposite the another video object in the plot. Alternatively, the first object may perform in the virtual video space scene as a new character. Alternatively, the first object may invite a second object to perform together in the virtual video space scene.

The VR device obtains the voice data of the first object as the object data in response to a scene editing operation for dubbing. For example, in the scene shown in FIG. 2a, after the object A (the first object) triggers the dubbing control 241, the VR device 21 may obtain voice data corresponding to a voice of the object A in the virtual video space scene 2000. The VR device may obtain the posture data and the figure data of the first object as the object data in response to a scene editing operation for performing. For example, in the scene shown in FIG. 2a, after the object A triggers the performance control 242, the VR device 21 may obtain posture data corresponding to an action form of the object A in the virtual video space scene 2000 and figure data corresponding to an object figure of the object A. The VR device responds to a scene editing operation for object invitation, and secondary creation for the multi-view video may be completed collaboratively by a plurality of persons instead of a single person. That is, the first object and the second object invited by the first object may enter the virtual video space scene corresponding to the same multi-view video. In this case, the VR device may obtain the object data of the first object during a performance for scene creation in the virtual video space scene, and may further obtain target object data of the second object during the performance for scene creation in the virtual video space scene. The first object may perform both dubbing and performing for scene creation. In this case, the VR device may obtain all the voice data, the posture data, and the figure data of the first object as the object data.

A possible implementation process in which the VR device obtains the object data of the first object in the virtual video space scene in response to the scene editing operation on the virtual video space scene may be as follows: The VR device responds to the scene editing operation performed by the first object on the virtual video space scene, and then displays a video clip input control for the virtual video space scene on the virtual display interface. The VR device may obtain input clip progress information for the multi-view video in response to an input operation on the video clip input control, and determine a video clip indicated by the clip progress information as a to-be-created video clip. When playing the to-be-created video clip, the VR device may obtain the object data of the first object in the virtual video space scene. According to this example of the present subject matter, the to-be-created video clip may be directly obtained to facilitate subsequent direct creation of the to-be-created video clip. This may reduce waiting time for the first object to wait until the to-be-created video clip is played, thereby improving human-computer interaction efficiency.

The first object may select a video clip from the multi-view video as the to-be-created video clip, and then perform for only the to-be-created video clip. For example, play duration of the multi-view video is two hours, and a character the first object intends to replace appears only from a $50^{th}$ minute to a $55^{th}$ minute of the multi-view video. If the VR device plays the multi-view video, the first object is required to wait for fifty minutes and then perform. Therefore, the first object may select a video clip from the $50^{th}$ minute to the $55^{th}$ minute as the to-be-created video clip. In this case, the VR device directly plays the to-be-created video clip, and the first object may play the character the first object intends to replace in the virtual video space scene, and the VR device may obtain the object data of the first object during the performance. The multi-view video may correspond to different real space scenes at different playing moments. For example, when the playing moment of the multi-view video is a $10^{th}$ minute, a corresponding real space scene is that an object D is sleeping. When the playing moment of the multi-view video is a $20^{th}$ minute, a corresponding real space scene is that the object D is singing. The virtual video space scene perceived by the first object may change based on the real space scene corresponding to the playing moment of the multi-view video. Therefore, when the playing moment of the multi-view video is the $10^{th}$ minute, a video object D (the video object D is generated based on the object D) in the virtual video space scene perceived by the object A is sleeping. When the playing moment of the multi-view video is the $20^{th}$ minute, the video object D in the virtual video space scene perceived by the object A is singing.

When playing the to-be-created video clip, the VR device may display a playing progress control bar on the virtual display interface. The playing progress control bar may include a pause control, a start control, and a multiple control. The VR device may pause playing of the to-be-created video clip in response to a trigger operation on the pause control. The VR device may continue playing the to-be-created video clip in response to a trigger operation on the start control. The VR device may adjust, in response to a selection operation on the multiple control, a playing speed of the to-be-created video clip according to a selected playing multiple. According to this example of the present subject matter, pausing, continuous playing, and variable-speed playing processing may be performed on the to-be-created video clip. This may flexibly adjust the to-be-created video clip, thereby meeting a performance requirement of the first object in real time.

Step S103: Play a created video associated with the multi-view video on the virtual display interface.

The created video is obtained by performing editing processing on the virtual video space scene based on the object data.

When the object data is completely obtained, the VR device may fuse the object data and the virtual video space scene to obtain the created video. When the object data is the voice data obtained by the VR device in response to the scene editing operation for dubbing, based on the scene editing operation of the first object, the VR device may replace video voice data of a specific video object in the virtual video space scene with the voice data, or superimpose the voice data to the virtual video space scene. When the object data is the posture data and the figure data that obtained by the VR device in response to the scene editing operation for performing, the VR device may generate the performance object with the posture data and the figure data, and replace a specific video object in the virtual video space scene with the performance object, or directly add the performance object to the virtual video space scene. When the object data is the object data obtained by the VR device in response to the scene editing operation for object invitation, and the VR device obtains the target object data of the second object invited by the first object, the VR device may fuse both the object data and the target object data to the virtual video space scene.

The created video may correspond to two data forms. One data form is a video mode, for example, a Moving Picture Experts Group 4 (MP4) file. In this case, the created video may be played in not only the VR device but also another terminal device with a video playing function. The other data form is a log file for the virtual video space scene. The log file is file of a specific format, and includes all data recorded this time. The first object may open the file of the specific format by using an editor, that is, may browse and edit a digital scene at a computer (the digital scene includes the virtual video space scene that the first object wants to keep and the performance object with the object data). Browsing and editing the digital scene at the computer is similar to a real-time editing operation of a game engine. A user may perform speed, sound, light, picture, filter, special style, and other processing on entire content in the editor, and may also perform retouching and timbre processing on the video object corresponding to the character or the performance object. Some preset special effects and props may further be added for the performance. Finally, a new created video may be generated. The first object may store the created video in local/cloud space, or may transmit the created video to another object by using a VR social application, a non-VR social application, a social short-video application, or the like.

In this example of the present subject matter, the first object may perceive by using the VR device that the first object is in the virtual video space scene corresponding to the multi-view video. The virtual video space scene simulates the real space scene corresponding to the multi-view video. The first object is in the virtual video space scene corresponding to the multi-view video, and may feel an emotional expression of the character in the multi-view video from the first view and experience the plot in depth. The first object may further perform scene creation in the virtual video space scene. The VR device may obtain the object data of the first object during scene creation, and then fuse the object data and the virtual video space scene to obtain the created video. Thus, it can be seen that the first object may break a physical limit and perform secondary creation on the multi-view video in the virtual video space scene corresponding to the real space scene without spending time and money in laying out the real space scene corresponding to the multi-view video. This avoids time and money being spent in laying out the real space scene corresponding to the multi-view video to reduce creation costs while enriching presentation modes of the multi-view video and interaction modes.

Figure 4:
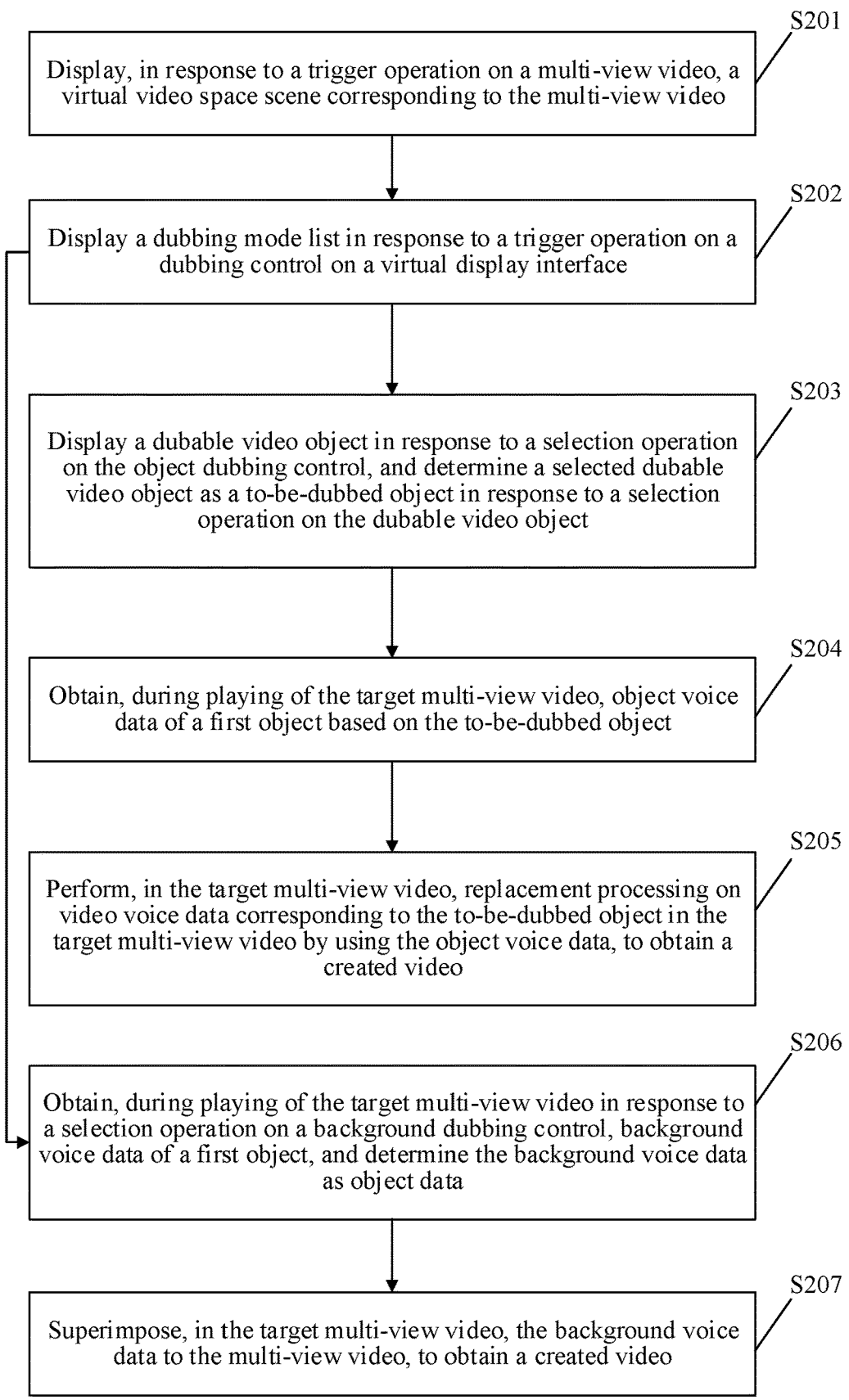
FIG. 4 is a schematic flowchart of a data processing method for VR-based dubbing according to an example of the present subject matter.

Refer to FIG. 4 to better understand a process in FIG. 3 that the VR device obtains, in response to the scene editing operation for dubbing, the voice data of the first object as the object data, and obtains the created video according to the object data. FIG. 4 is a schematic flowchart of a data processing method for VR-based dubbing according to an example of the present subject matter. The data processing method may be performed by the VR device. For ease of understanding, an example in which the method is performed by the VR device is used for description in this example of the present subject matter. The data processing method may include at least the following step S201 to step S203:

Step S201: Display, in response to the trigger operation on the multi-view video, the virtual video space scene corresponding to the multi-view video.

For implementation of step S201, refer to step S101 in the example corresponding to FIG. 3.

In some examples, the scene editing operation includes a trigger operation on a dubbing control on the virtual display interface. The operation of obtaining object data of the first object in the virtual video space scene in response to a scene editing operation on the virtual video space scene in step S102 may be implemented by using the following technical solution: playing the multi-view video, obtaining the voice data of the first object in the virtual video space scene in response to the trigger operation on the dubbing control on the virtual display interface, and determining the voice data of the first object as the object data applied to the multi-view video. According to this example of the present subject matter, the voice data of the first object may be obtained as the object data by triggering the dubbing control, so that the object data may be obtained efficiently, and the human-computer interaction efficiency may be improved.

The voice data of the first object includes at least one of the following: object voice data and background voice data. The foregoing playing the multi-view video, obtaining the voice data of the first object in the virtual video space scene in response to the trigger operation on the dubbing control on the virtual display interface and determining the voice data of the first object as the object data applied to the multi-view video may be implemented by the following step S202 to step S204 and step S206.

Step S202: Display a dubbing mode list in response to the trigger operation on the dubbing control on the virtual display interface.

The dubbing mode list includes an object dubbing control and a background dubbing control.

The VR device may independently display the dubbing control on the virtual display interface, for example, the dubbing control 241 displayed in FIG. 2a. In this case, the scene editing operation for dubbing may be a trigger operation on the dubbing control 241.

The object dubbing control and the background dubbing control correspond to two dubbing modes respectively. The object dubbing control corresponds to an object dubbing mode. In this case, the first object may dub at least one dubbable video object in the multi-view video, that is, the voice of the first object may replace an original voice of the dubbable video object. The background dubbing control corresponds to a background dubbing mode. The first object may dub the entire multi-view video. That is, when there is an original voice of the character and a background sound in the multi-view video, the VR device may record an additional voice of the first object, and use the recorded additional voice of the first object as a voice-over, a sound effect, or the like.

Figure 5A:
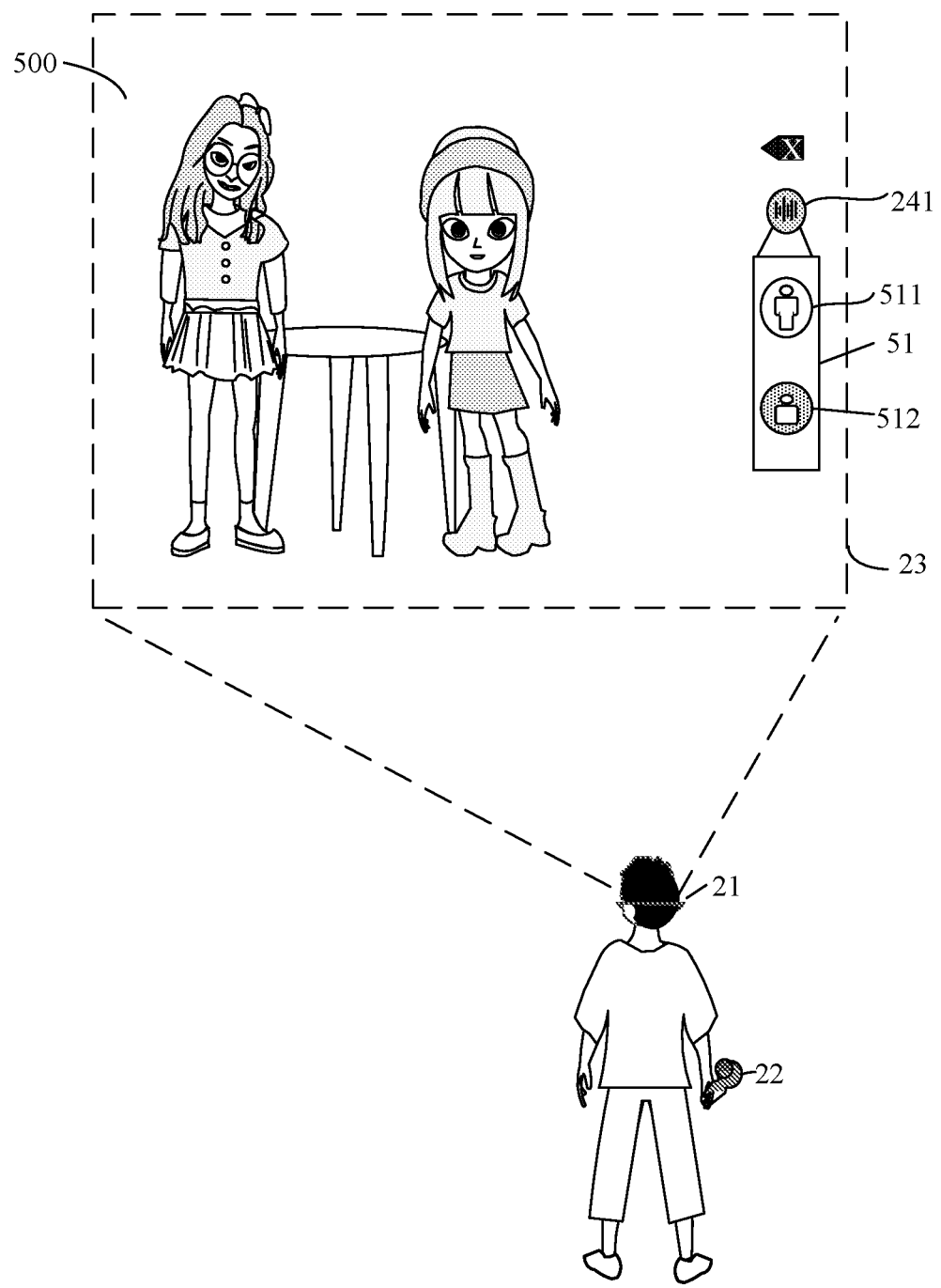
FIG. 5a is a schematic diagram of a dubbing mode list display scene according to an example of the present subject matter.

FIG. 5a is a schematic diagram of a dubbing mode list display scene according to an example of the present subject matter. Based on the scene shown in FIG. 2a, a response is made to a trigger operation performed by the object A to select the dubbing control 241 by using the VR handle 22.

The VR device 21 may display a dubbing mode list 51 on the virtual display interface 23 in response to the trigger operation on the dubbing control 241. The dubbing mode list 51 may include an object dubbing control 511 and a background dubbing control 512. The dubbing mode list 51 may be independently displayed over a virtual video picture 500. The virtual video picture 500 is used for presenting the virtual video space scene in the view of the object A.

Step S203: Display the dubbable video object in response to a selection operation on the object dubbing control, and determine a selected dubbable video object as a to-be-dubbed object in response to a selection operation on the dubbable video object.

The dubbable video object is a video object presented in the multi-view video.

The VR device may determine only a video object currently displayed on the virtual display interface as a dubbable video object, or may determine all video objects presented in the multi-view video as dubbable video objects. The first object may select one or more video objects from the dubbable video object as one or more to-be-dubbed object for dubbing. The VR device may highlight the to-be-dubbed object.

Figure 5B:
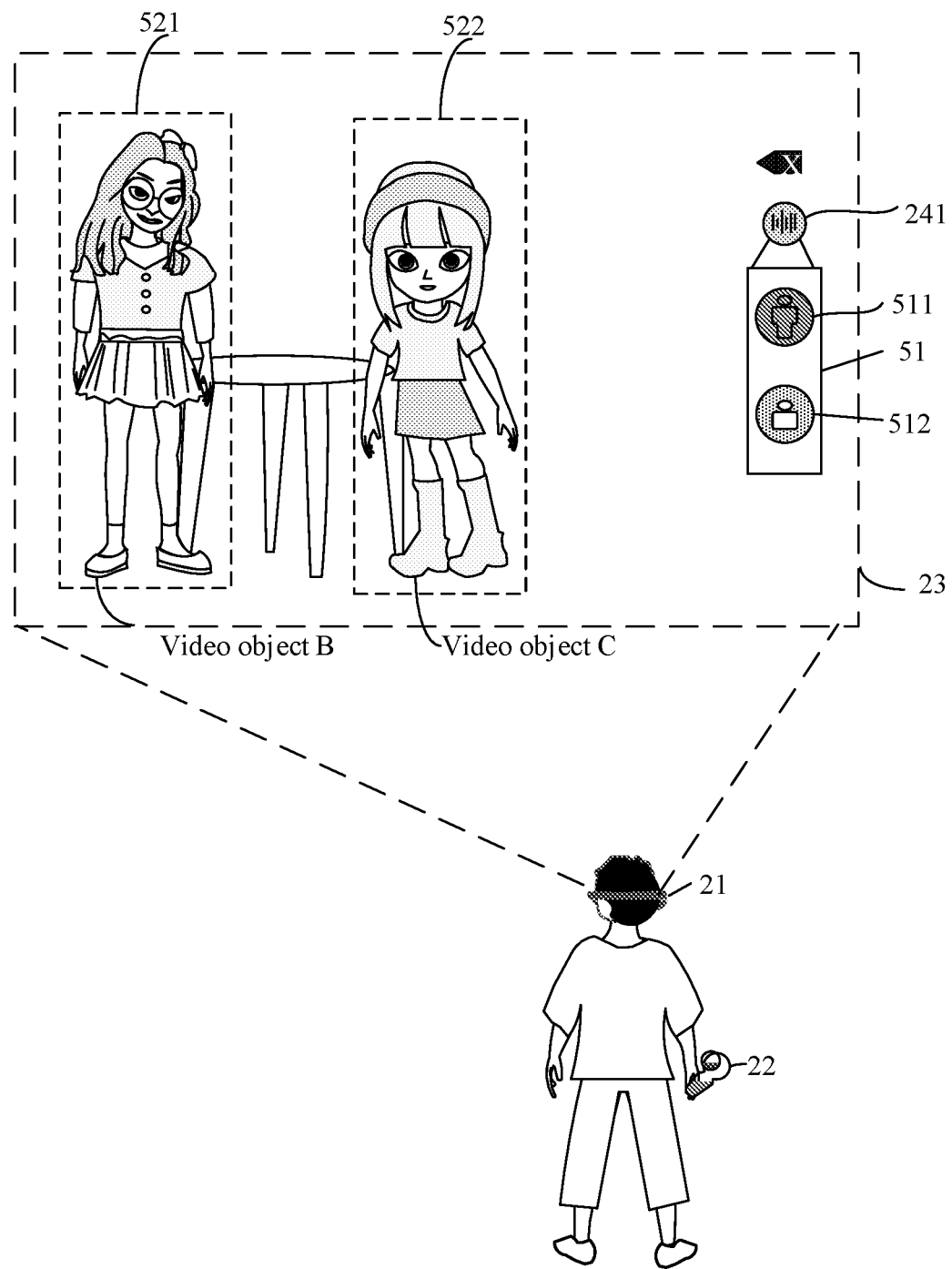
FIG. 5b is a schematic diagram of a dubbable video object display scene according to an example of the present subject matter.

An example in which the VR device determine only the video object currently displayed on the virtual display interface as the dubbable video object is used for description. FIG. 5b is a schematic diagram of a dubbable video object display scene according to an example of the present subject matter. Based on the scene shown in FIG. 5a, the VR device 21 may determine, in response to a trigger operation performed by the object A on the object dubbing control 511, the video object B and the video object C that are currently displayed on the virtual display interface 23 as dubbable video objects, and highlight the dubbable video objects. As shown in FIG. 5b, the VR device 21 may highlight the video object B on the virtual display interface 23 by using a dashed box 521, and highlight the video object C by using a dashed box 522. In this case, the object A may know that the video object B and the video object C are dubbable video objects, and then determine the to-be-dubbed object by using the VR handle 22.

Step S204: Obtain, during playing of the multi-view video, the object voice data of the first object based on the to-be-dubbed object.

Through step S202 to step S204, the object voice data may be obtained flexibly, and the object voice data may be determined as the object data according to a user requirement. Therefore, the human-computer interaction efficiency may be improved in a voice dimension.

A process of obtaining, during playing of the multi-view video, the object voice data of the first object based on the to-be-dubbed object may be as follows: the VR device performs muting processing on video voice data corresponding to the to-be-dubbed object during playing of the multi-view video. The VR device displays, in a case that the to-be-dubbed object is in a vocalizing state, text information and sound track information that correspond to the video voice data, obtains the object voice data of the first object, and determines the object voice data as the object data. The text information and the sound track information may be used for indicating lines and an intensity that correspond to an original voice of the to-be-dubbed object to the first object. The vocalizing state is a state of the to-be-dubbed object in the multi-view video during speaking. According to this example of the present subject matter, the user may be helped in dubbing by using the text information and the sound track information. In addition, since the to-be-dubbed object is in the vocalizing state, it may be ensured that voice data matches a picture, and a success rate of dubbing may be improved. Therefore, the object voice data is prevented from being repeatedly obtained, and resource utilization and the human-computer interaction efficiency are improved.

Figure 5C:
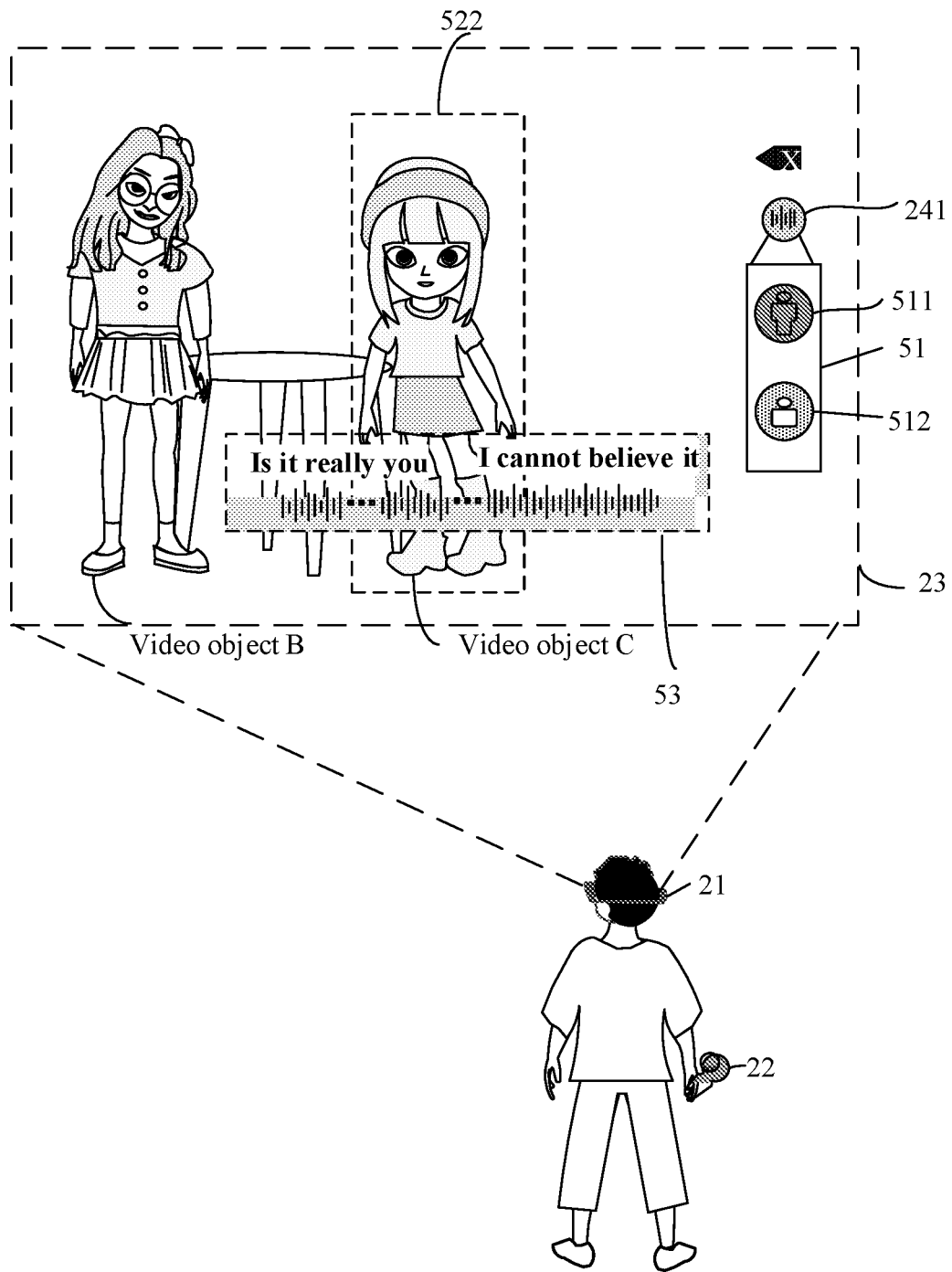
FIG. 5c is a schematic diagram of an object dubbing scene according to an example of the present subject matter.

FIG. 5c is a schematic diagram of an object dubbing scene according to an example of the present subject matter. Based on the scene shown in FIG. 5b, the object A may select the dubbable video object by using the VR handle 22. If the object A selects the video object C as the to-be-dubbed object, the VR device may continue to highlight the to-be-dubbed object, that is, the video object C, by using the dashed box 522 during playing of the multi-view video, and perform muting processing on video voice data corresponding to the video object C. In this way, when the video object C is in the vocalizing state, the object A cannot hear an original voice of the video object C. The VR device 21 may further display prompt information 53 corresponding to the video voice data of the video object C when the video object C is in the vocalizing state. The prompt information 53 includes text information and sound track information. The object A may know according to the displayed prompt information 53 that the video object C is to be dubbed. When displaying the prompt information 53, the VR device may perform voice acquisition on the object A to obtain object voice data of the object A.

Step S205: Perform, in the multi-view video, replacement processing on the video voice data corresponding to the to-be-dubbed object in the multi-view video by using the object voice data, to obtain the created video.

After replacing the video voice data of the to-be-dubbed object with the object voice data of the first object in the multi-view video, the VR device may obtain the created video after the first object dubs the multi-view video. In the created video, when the to-be-dubbed object is in the vocalizing state, a voice corresponding to the object voice data of the first object may be played.

Step S206: Obtain, during playing of the multi-view video in response to a selection operation on the background dubbing control, the background voice data of the first object, and determine the background voice data as the object data.

Through step S206, the background voice data may be obtained flexibly, and the background voice data may be determined as the object data according to a user requirement. Therefore, the human-computer interaction efficiency may be improved in a voice dimension.

Specifically, FIG. 5a is used as an example. When the object A intends to perform background dubbing, the object A may trigger the background dubbing control 512. Then, the VR device 21 may obtain the background voice data corresponding to the voice of the object A during playing of the multi-view video.

Step S207: Superimpose, in the multi-view video, the background voice data to the multi-view video, to obtain the created video.

The VR device may add the voice of the object A to the multi-view video based on the background voice data, thereby obtaining the created video.

By using the data processing method provided in this example of the present subject matter, the first object may dub the character in the multi-view video in the virtual video space scene corresponding to the multi-view video, or add the background sound and the cross-over, to obtain the created video. Lightweight fusion of an audience to video content is implemented by using a small quantity of data processing resources, the human-computer interaction efficiency is improved, and the video presentation modes and the interaction modes are enriched.

Figure 6:
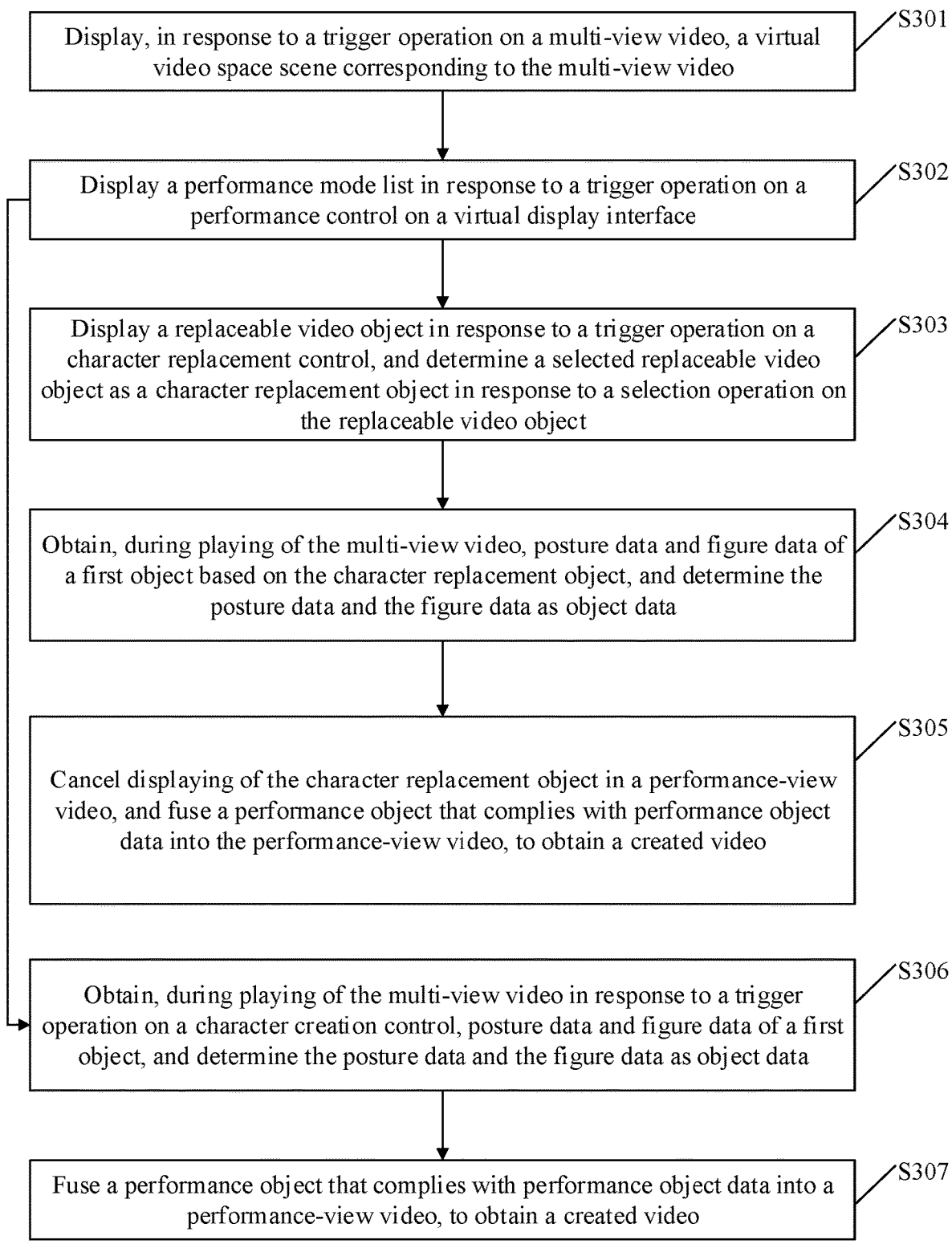
FIG. 6 is a schematic flowchart of a data processing method for a VR-based performance according to an example of the present subject matter.

Refer to FIG. 6 to better understand a process in FIG. 3 that the VR device obtains, in response to the scene editing operation for performing, the posture data and the figure data of the first object as the object data, and then obtains the created video according to the object data. FIG. 6 is a schematic flowchart of a data processing method for a VR-based performance according to an example of the present subject matter. The data processing method may be performed by the VR device. For ease of understanding, an example in which the method is performed by the VR device is used for description in this example of the present subject matter. The data processing method may include at least the following step S301 to step S303.

Step S301: Display, in response to the trigger operation on the multi-view video, the virtual video space scene corresponding to the multi-view video.

Specifically, for implementation of step S301, refer to step S101 in the example corresponding to FIG. 3.

In some examples, the scene editing operation includes a trigger operation on a performance control on the virtual display interface. The operation of obtaining object data of the first object in the virtual video space scene in response to a scene editing operation on the virtual video space scene in step S102 may be implemented by using the following technical solution: playing the multi-view video, obtaining the posture data and the figure data of the first object in the virtual video space scene in response to the trigger operation on the performance control on the virtual display interface, and determining the posture data and the figure data as the object data applied to the multi-view video. The created video includes the performance object associated with the first object. The performance object in the created video is presented based on the posture data and the figure data. According to this example of the present subject matter, the voice data of the first object may be obtained as the object data by triggering the performance control, so that the object data may be obtained efficiently, and the human-computer interaction efficiency may be improved.

The foregoing obtaining the posture data and the figure data of the first object in the virtual video space scene in response to the trigger operation on the performance control on the virtual display interface and determining the posture data and the figure data as the object data may be implemented by the following step S302 to step S304 and step S306.

Step S302: Display a performance mode list in response to the trigger operation on the performance control on the virtual display interface.

The performance mode list includes a character replacement control and a character creation control.

For the plot presented by the multi-view video, the first object may perform in the virtual video space scene corresponding to the multi-view video according to a creative idea of the first object, to obtain a created video after the first object performs in the plot of the multi-view video. The VR device may independently display the performance control on the virtual display interface, for example, the performance control 242 displayed in FIG. 2*a*. In this case, the scene editing operation for performing may be the trigger operation on the performance control on the virtual display interface.

The character replacement control and the character creation control correspond to two performance modes respectively. The character replacement control corresponds to a character replacement mode. In this case, the first object may select to replace a video object corresponding to any character in the multi-view video to play the character. The character creation control corresponds to a character creation mode. In this case, the first object may add a new character to perform in a virtual video space scene corresponding to the multi-view video at a target moment. The character may be a character appearing in a virtual video space scene corresponding to the multi-view video at another moment, or a brand-new character customized by the first object.

Figure 7A:
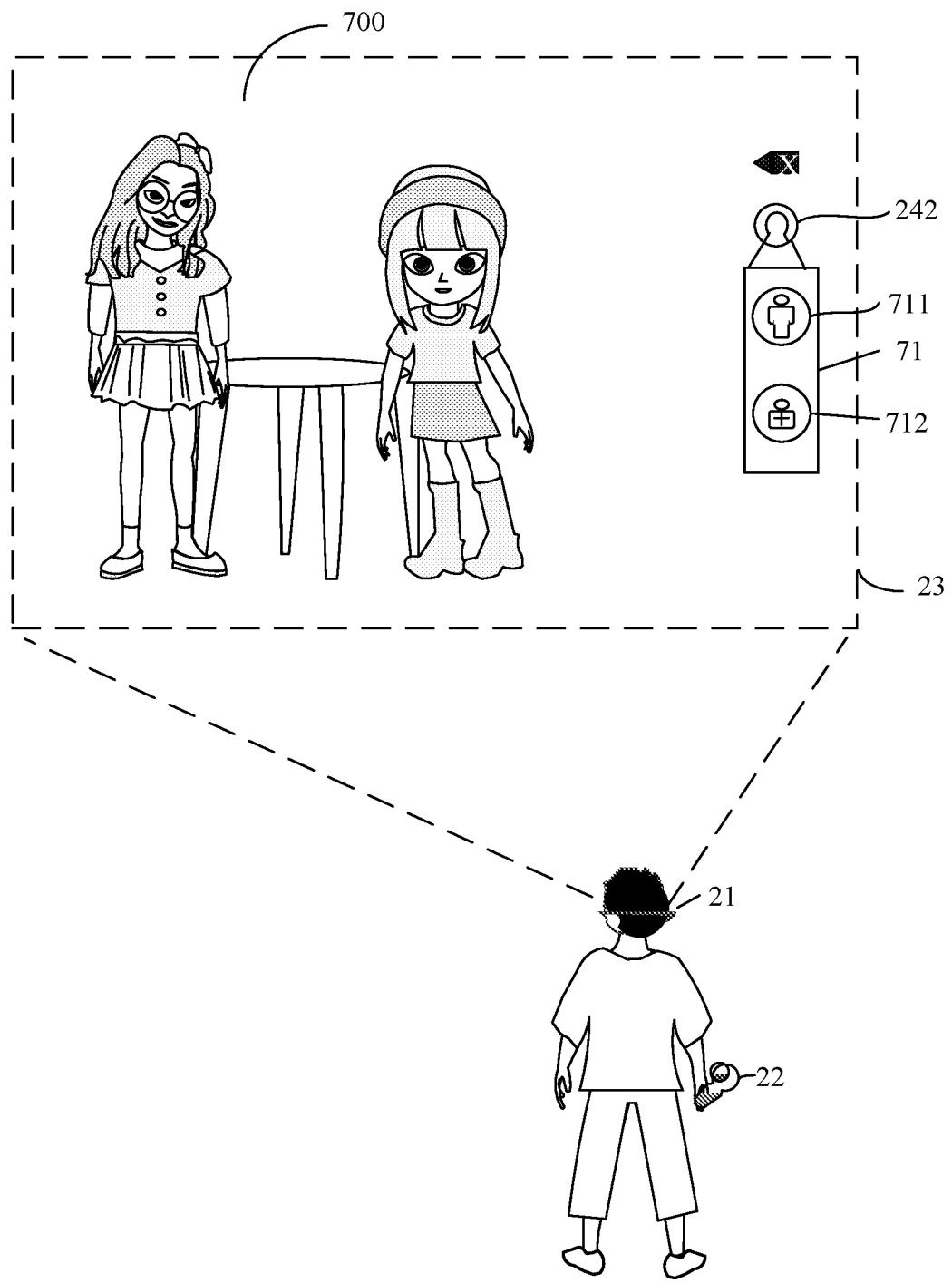
FIG. 7a is a schematic diagram of a performance mode list display scene according to an example of the present subject matter.

FIG. 7*a* is a schematic diagram of a performance mode list display scene according to an example of the present subject matter. Based on the scene shown in FIG. 2*a*, if the object A selects the performance control 242 by using the VR handle 22, the VR device 21 may display a performance mode list 71 on the virtual display interface 23 in response to a trigger operation on the performance control 242. The performance mode list 71 may include a character replacement control 711 and a character creation control 712. The performance mode list 71 may be independently displayed over a virtual video picture 700. The virtual video picture 700 is used for presenting the virtual video space scene in the view of the object A.

Step S303: Display a replaceable video object in response to a trigger operation on the character replacement control, and determine a selected replaceable video object as a character replacement object in response to a selection operation on the replaceable video object.

The replaceable video object is a video object presented in the multi-view video.

A possible implementation process in which the VR device displays the replaceable video object in response to the trigger operation on the character replacement control, and determines the selected replaceable video object as the character replacement object in response to the selection operation on the replaceable video object may be as follows: the VR device determines, in response to the trigger operation on the character replacement control, a video object currently displayed in an object virtual video picture as the replaceable video object, displays, in response to a marking operation on the replaceable video object, a marked replaceable video object according to a first display mode, the first display mode is different from a display mode of a video object other than the replaceable video object, where the first display mode may be highlighting, for example, adding a filter to the marked replaceable video object, and determines the marked replaceable video object as the character replacement object. The object virtual video picture is used for presenting a virtual video space scene in a current view. According to this example of the present subject matter, the marked replaceable video object may be highlighted to prompt the user during the performance, so that the human-computer interaction efficiency is improved.

Figure 7B:
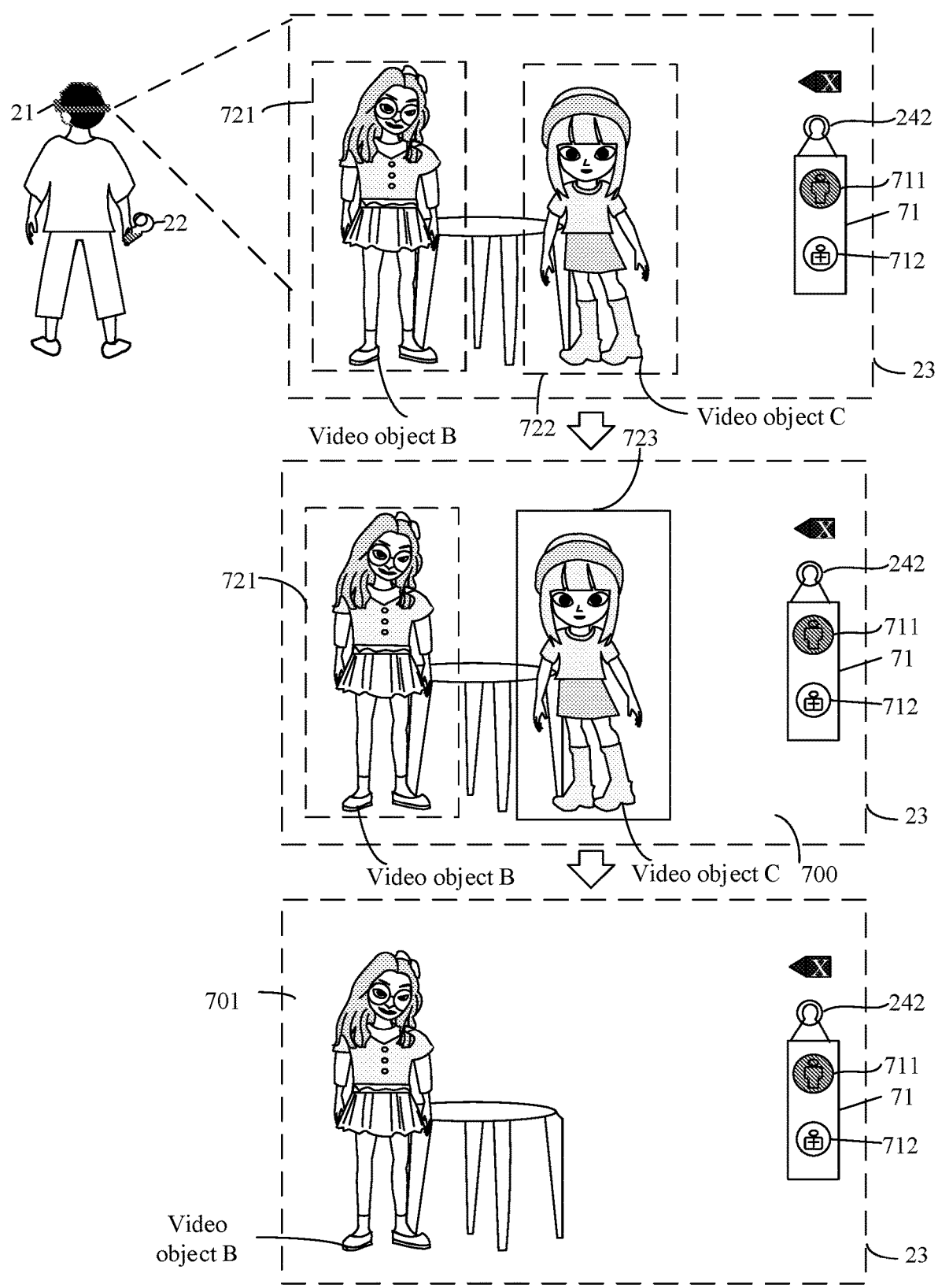
FIG. 7b is a schematic diagram of a replaceable video object selection scene according to an example of the present subject matter.

FIG. 7*b* is a schematic diagram of a replaceable video object selection scene according to an example of the present subject matter. Based on the scene shown in FIG. 7*a*, if the object A triggers the character replacement control 711 by using the VR handle 22, the VR device 21 may determine a video object currently displayed in the virtual video picture 700 (that is, the foregoing object virtual video picture) as a replaceable video object. As shown in FIG. 7*b*, the video object B and the video object C may be determined as replaceable video objects. The VR device 21 may highlight the replaceable video object. For example, the VR device 21 may highlight the video object B on the virtual display interface 23 by using a dashed box 721, and highlight the video object C by using a dashed box 722. In this case, the object A may know that the video object B and the video object C are replaceable video objects. The object A may mark the replaceable video object by using the VR handle 22. If the object A marks the video object C, the VR device 21 may perform new highlighting on the marked video object C, for example, highlight the video object C by using a solid box 723 instead of the dashed box 722. Then, the VR device 21 may determine the video object C as a character replacement object. Then, the VR device 21 may turn off highlighting, and cancel displaying of the video object C on the virtual display interface 23. As shown in FIG. 7b, the VR device 21 may switch displaying of the virtual video picture 700 including the video object C to a virtual video picture 701 not including the video object C.

A possible implementation process in which the VR device displays the replaceable video object in response to the trigger operation on the character replacement control, and determines the selected replaceable video object as the character replacement object in response to the selection operation on the replaceable video object may be as follows: the VR device displays at least one video clip corresponding to the multi-view video in response to the trigger operation on the character replacement control, displays a video object in a selected video clip in response to a selection operation on the at least one video clip, determines the video object in the selected video clip as the replaceable video object, displays, in response to a marking operation on the replaceable video object, a marked replaceable video object according to a first display mode, the first display mode is different from a display mode of a video object other than the replaceable video object, where the first display mode may be highlighting, for example, adding a filter to the marked replaceable video object, and determines the marked replaceable video object as the character replacement object. According to this example of the present subject matter, the marked replaceable video object may be highlighted to prompt the user during the performance, so that the human-computer interaction efficiency is improved.

Figure 7C:
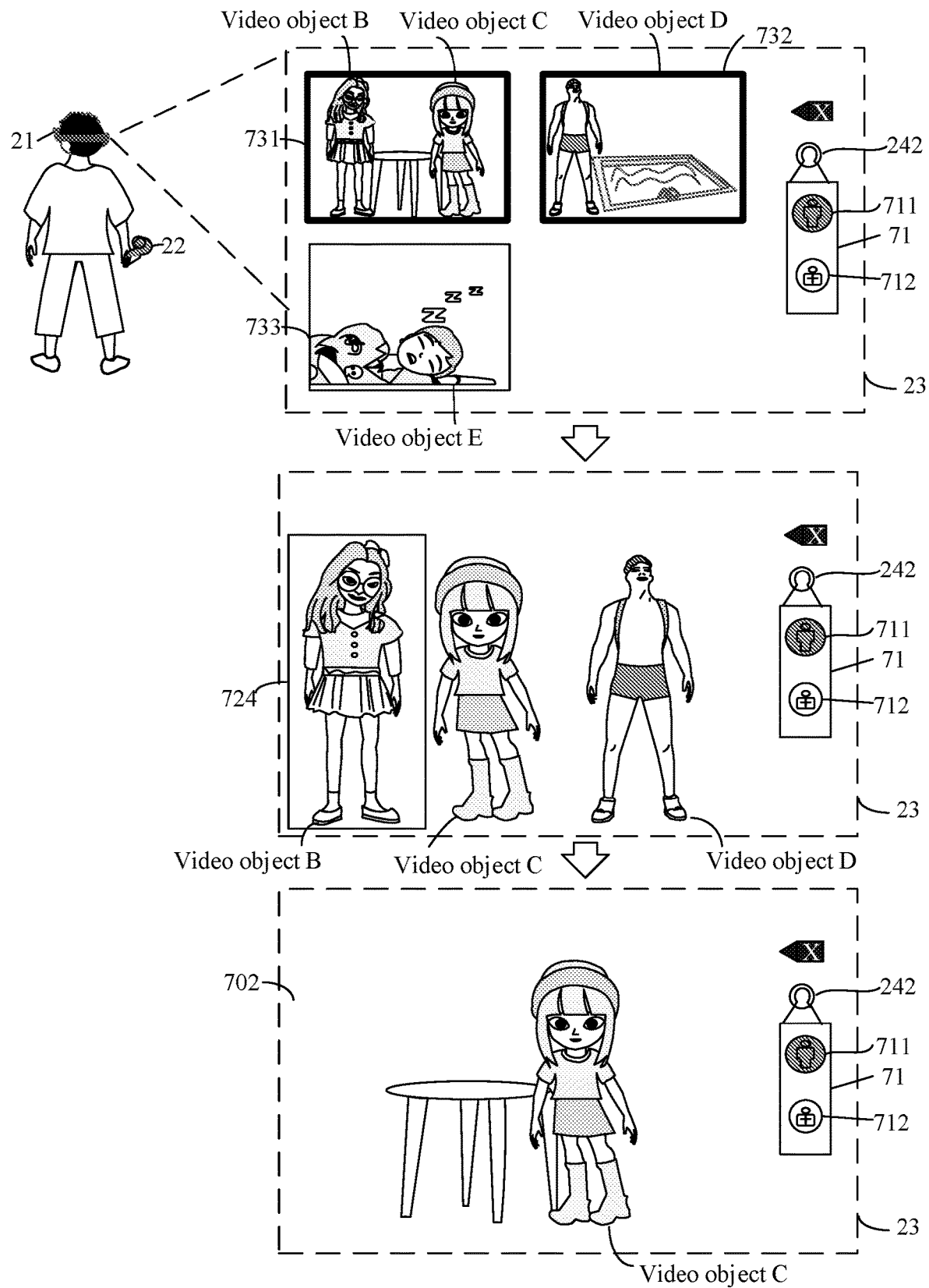
FIG. 7c is a schematic diagram of another replaceable video object selection scene according to an example of the present subject matter.

FIG. 7c is a schematic diagram of another replaceable video object selection scene according to an example of the present subject matter. Based on the scene shown in FIG. 7a, if the object A triggers the character replacement control 711 by using the VR handle 22, the VR device may display the at least one video clip corresponding to the multi-view video. As shown in FIG. 7c, the VR device 21 displays a video clip 731, a video clip 732, and a video clip 733 in response to a trigger operation on the character replacement control 711. The video clip 731, the video clip 732, and the video clip 733 all belong to the multi-view video. The video clip 731 includes the video object B and the video object C. The video clip 732 includes the video object D. The video clip 733 includes a video object E. The VR device 21 may highlight the selected video clip by using a black frame. It can be seen from FIG. 7c that the object A selects the video clip 731 and the video clip 732. After selection of the object A, the VR device 21 may determine the video object B, the video object C, and the video object D as replaceable video objects, and then display the replaceable video objects. The object A may select at least one of the replaceable video objects as the character replacement object. As shown in FIG. 7c, the object A may mark the replaceable video object by using the VR handle 22. If the object A marks the video object B, the VR device 21 may highlight the marked video object B, for example, circle the video object by using a solid box 724. After the object A confirms to end marking, the VR device 21 may determine the video object B as a character replacement object. Then, the VR device 21 may turn off highlighting, and cancel displaying of the video object B on the virtual display interface 23. As shown in FIG. 7c, the VR device 21 may switch displaying of the virtual video picture 700 to a virtual video picture 702 not including the video object B.

Step S304: Obtain, during playing of the multi-view video, the posture data and the figure data of the first object based on the character replacement object, and determine the posture data and the figure data as the object data.

After the first object determines the character replacement object, the VR device may cancel displaying of the character replacement object. Therefore, the character replacement object will no more appear in the virtual video space scene perceived by the first object, but another video object, a prop, a background, or the like still exists in another space scene. Thus, it can be seen that if the first object intends to play a character corresponding to the character replacement object, the first object may perform in the perceived virtual video space scene without laying out the real space scene corresponding to the multi-view video, and the VR device may capture the posture data and the figure data of the first object.

Figure 7D:
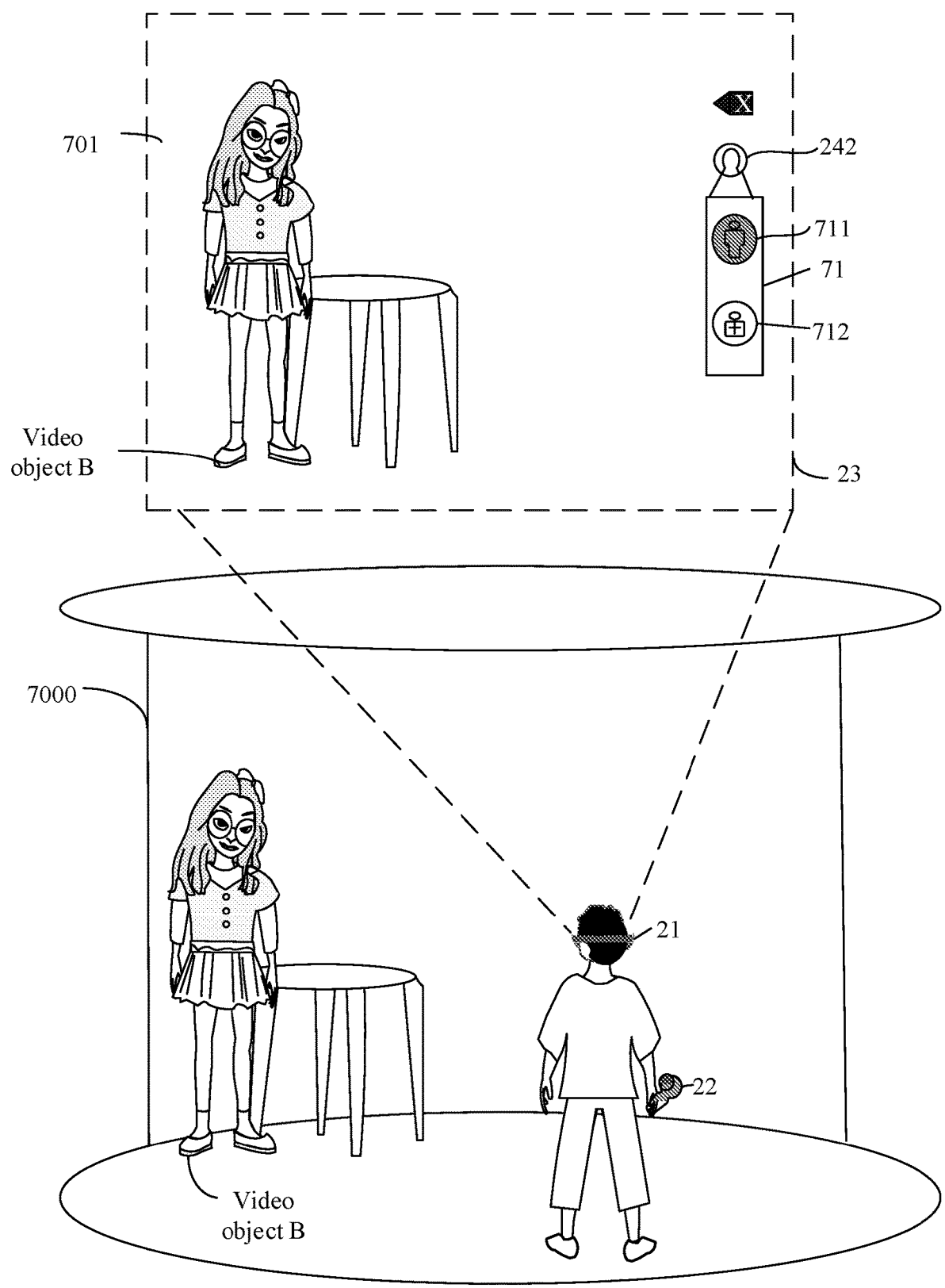
FIG. 7d is a schematic diagram of a scene in which an object performs based on VR according to an example of the present subject matter.

Refer to FIG. 7d together. FIG. 7d is a schematic diagram of a scene in which an object performs based on VR according to an example of the present subject matter. Based on the scene shown in FIG. 7b, the VR device 21 displays the virtual video picture 701 not including the video object C on the virtual display interface. In this case, FIG. 7d shows the virtual video space scene perceived by the object A, and the object A may think of being in a virtual video space scene 7000. It can be seen from the above that the object A perceives the virtual video space scene 7000 as a 3D space scene, but the object A currently can see only a virtual video space scene 7000 in a video corresponding to the virtual video picture 701. The video object B is used as an example. Only a front of the video object B is displayed in the virtual video picture 701, and the object A can see only the front of the video object B. In this case, the object A may think that the video object B stands in front of the object A, facing the object A. When the object A walks, the VR device 21 may obtain the virtual video picture in the view of the object A anytime, and display the virtual video picture on the virtual display interface, such that the object A may see the virtual video space scene 7000 in the view of the object A anytime. Therefore, in the perception of the object A, the object A may walk freely in the virtual video space scene 7000, and may certainly conduct a corresponding performance in the virtual video space scene 7000. During the performance of the object A, both posture data and figure data of the object A may be obtained by the VR device 21.

When obtaining the posture data and the figure data of the first object, the VR device may display a replacement transparency input control for the character replacement object on the virtual display interface. Then, the VR device may obtain input transparency information for the character replacement object in response to an input operation on the replacement transparency input control, perform transparency update displaying on the character replacement object on the virtual display interface according to the transparency information, and display a position cursor of the character replacement object after transparency update in the virtual video space scene.

Figure 7E:
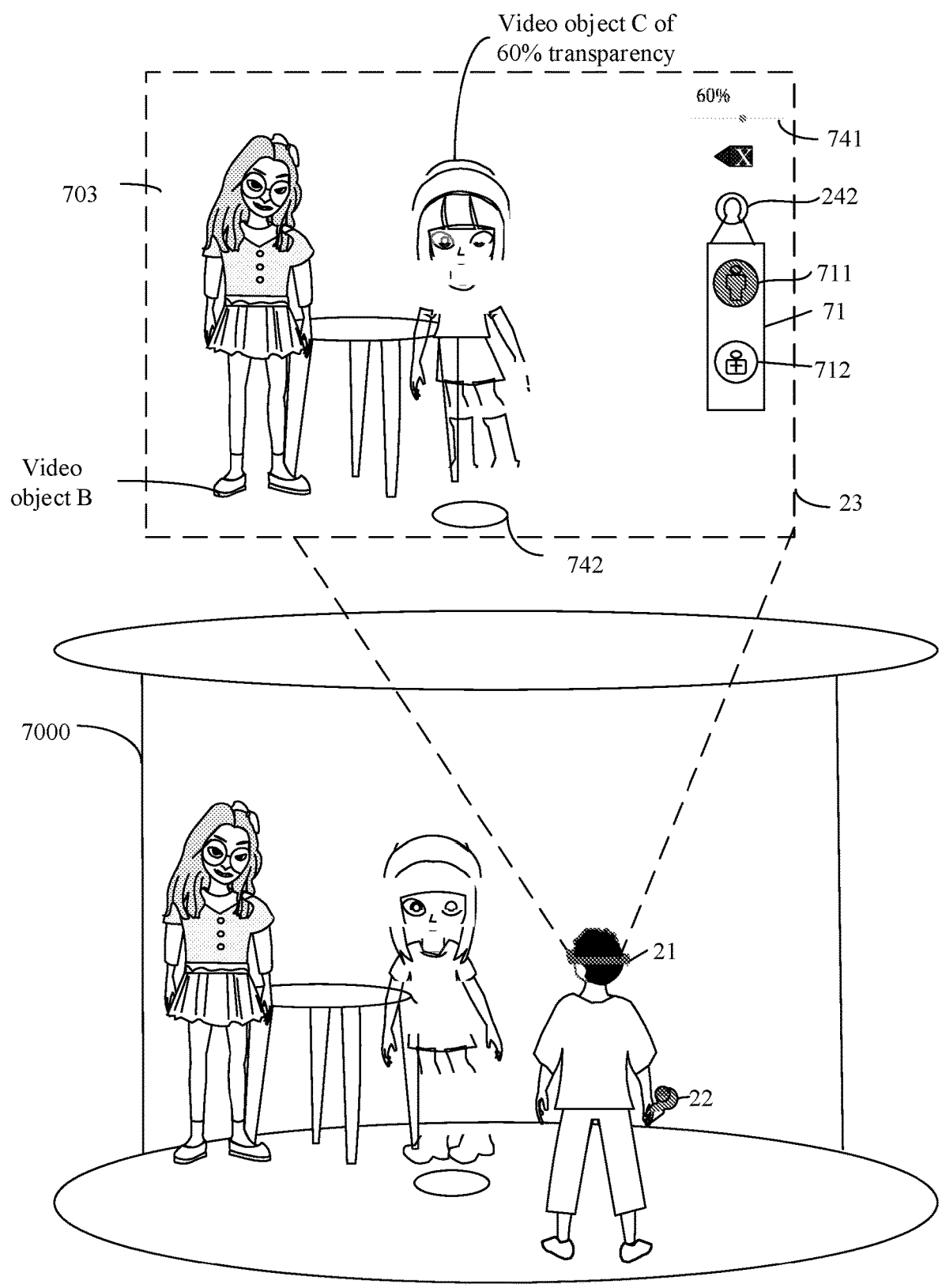
FIG. 7e is a schematic diagram of a scene of VR-based transparent displaying of an object according to an example of the present subject matter.

In the virtual video space scene 7000 shown in FIG. 7d, the object A cannot see the video object C. The object A may perform freely. However, if the object A intends to imitate an action form of the object C, the object A may input the transparency information, for example, 60% transparency, for the character replacement object by using a replacement transparency input control 741. In this case, the VR device 21 may redisplay the video object C with the 60% transparency on the virtual display interface 23, and display a position cursor on the virtual display interface. The position cursor is used for indicating a position of the video object C in the virtual video space scene 7000 to the object A. FIG. 7e is a schematic diagram of a scene of VR-based transparent displaying of an object according to an example of the present subject matter. As shown in FIG. 7e, after obtaining the transparency information in response to the input operation on the replacement transparency input control 741, the VR device 21 may switch, on the virtual display interface 23, displaying of the virtual video picture 701 not including the video object C to a virtual video picture 703 including the video object C of the 60% transparency. A position cursor 74 is displayed in the virtual video picture 703. In this case, the object A may see the video object C of the 60% transparency in front in the perceived virtual video space scene 7000, and a position cursor 742 is displayed at the foot of the video object C of the 60% transparency. The object A may determine a position of the character Xiaoyi corresponding to the video object C in the virtual video space scene 7000 by using the position cursor 742. In addition, the object A may learn a body shape, an action, a performance rhythm, or the like of the video object C according to the video object C of the 60% transparency, to play the character Xiaoyi. It is to be noted that the video object C of the 60% transparency may not appear in the created video.

Through step S302 to step S304, the posture data and the figure data applied to the character replacement object may be obtained flexibly. Therefore, the human-computer interaction efficiency may be improved in an image dimension.

Step S305: Cancel displaying of the character replacement object in a performance-view video, and fuse the performance object that complies with performance object data into the performance-view video, to obtain the created video.

The performance-view video is obtained by shooting the virtual video space scene in a performance view during playing of the multi-view video after triggering of a performance control. The performance object data is data presented by the object data in the performance view.

The created video includes the performance object associated with the first object. The performance object in the created video is presented based on the posture data and the figure data in the object data.

When the multi-view video is played by using the VR device, the virtual video space scene corresponding to the multi-view video may be viewed in different views, and the first object may walk freely in the virtual video space scene as the first object likes, to adjust a view in which the virtual video space scene is viewed. However, for a terminal device (for example, a mobile phone, a tablet, or a computer) with only a single-view video playing function, a specific video is played, only a video picture corresponding to a real space scene in a specific view may be presented at any moment. Therefore, when the multi-view video is played by using the terminal device, the terminal device may display only a video picture of the real space scene corresponding to the multi-view video in a master shot view. The master shot view may also be referred to as a director view, that is, an original film focus shot for the director. When performing scene creation on the multi-view video in the virtual video space scene, the first object may also set a single view in which the created video is played on the terminal device, that is, the performance view. When the multi-view video is not played after the first object triggers the performance control, the VR device may display a virtual camera control on the virtual display interface. The VR device may create a virtual camera in the performance view of the virtual video space scene in response to a creation operation performed by the first object on the virtual camera control. The virtual camera may be configured to output a video picture corresponding to the virtual video space scene in the performance view. When the multi-view video is played after the performance control is triggered, the VR device may shoot and record the virtual video space scene by using a virtual camera to obtain the performance-view video corresponding to the virtual video space scene in the performance view. Then, the VR device may cancel displaying of the character replacement object in the performance-view video. In addition, the VR device may obtain the data presented by the object data in the performance view, that is, the performance object data. The performance object data is used for presenting the performance object associated with the first object in the performance view. When the multi-view video is played, the virtual camera may move, that is, the performance view may change. That is, a performance view corresponding to a video picture output by the virtual camera at a moment A may be different from that a performance view corresponding to a video picture output by the virtual camera at a moment B. The VR device may create at least one virtual camera in the virtual video space scene. Each virtual camera may correspond to a different performance view at a same moment. Each camera may obtain a performance-view video through shooting and recording. In other words, the VR device may obtain at least one performance-view video at the same time, and each performance-view video may correspond to a different performance view. For a scene in which the VR device shoots the virtual video space scene by using the virtual camera, refer to a schematic diagram of a scene shown in subsequent FIG. 11c.

A position of the virtual camera in the virtual video space scene determines the performance view. A method for selecting the position of the virtual camera may include following shot, shooting in place, and moving freely. Following shot means that a view of the virtual camera may follow an original film focus shot view of the director, so that the position of the virtual camera in the virtual video space scene may follow a position of the director shot in the real space scene. Shooting in place means that during playing of the multi-view video, the virtual camera may perform shooting and recording at a fixed position in the virtual video space scene, and the position of the virtual camera remains unchanged. The fixed position may be selected by the first object. Moving freely means that during playing of the multi-view video, the first object may adjust the position of the virtual camera anytime, thereby changing a shooting view.

Step S306: Obtain, during playing of the multi-view video in response to a trigger operation on the character creation control, the posture data and the figure data of the first object, and determine the posture data and the figure data as the object data.

The VR device directly obtains, in response to the trigger operation on the character creation control, the posture data and the figure data of the first object as the object data during playing of the multi-view video, without performing other processing on the video object in the virtual video space scene corresponding to the multi-view video.

Step S307: Fuse the performance object that complies with performance object data into a performance-view video, to obtain the created video.

The performance-view video is the video obtained in step S305 by shooting the virtual video space scene by using the virtual camera. The VR device is required only to fuse the performance object with the performance object data into the performance-view video without processing another video object in the performance-view video.

For example, when obtaining the posture data and the figure data of the first object, the VR device may display a mirror preview control on the virtual display interface. The VR device may display a performance virtual video picture in a performance preview region on the virtual display interface in response to a trigger operation on the mirror preview control. The performance virtual video picture includes the performance object fused into the virtual video space scene. According to this example of the present subject matter, the first object may view the performance virtual video picture to adjust the performance of the first object. Therefore, the first object is prevented from performing modification for many times because of performance failures, and the human-computer interaction efficiency is improved.

Figure 7F:
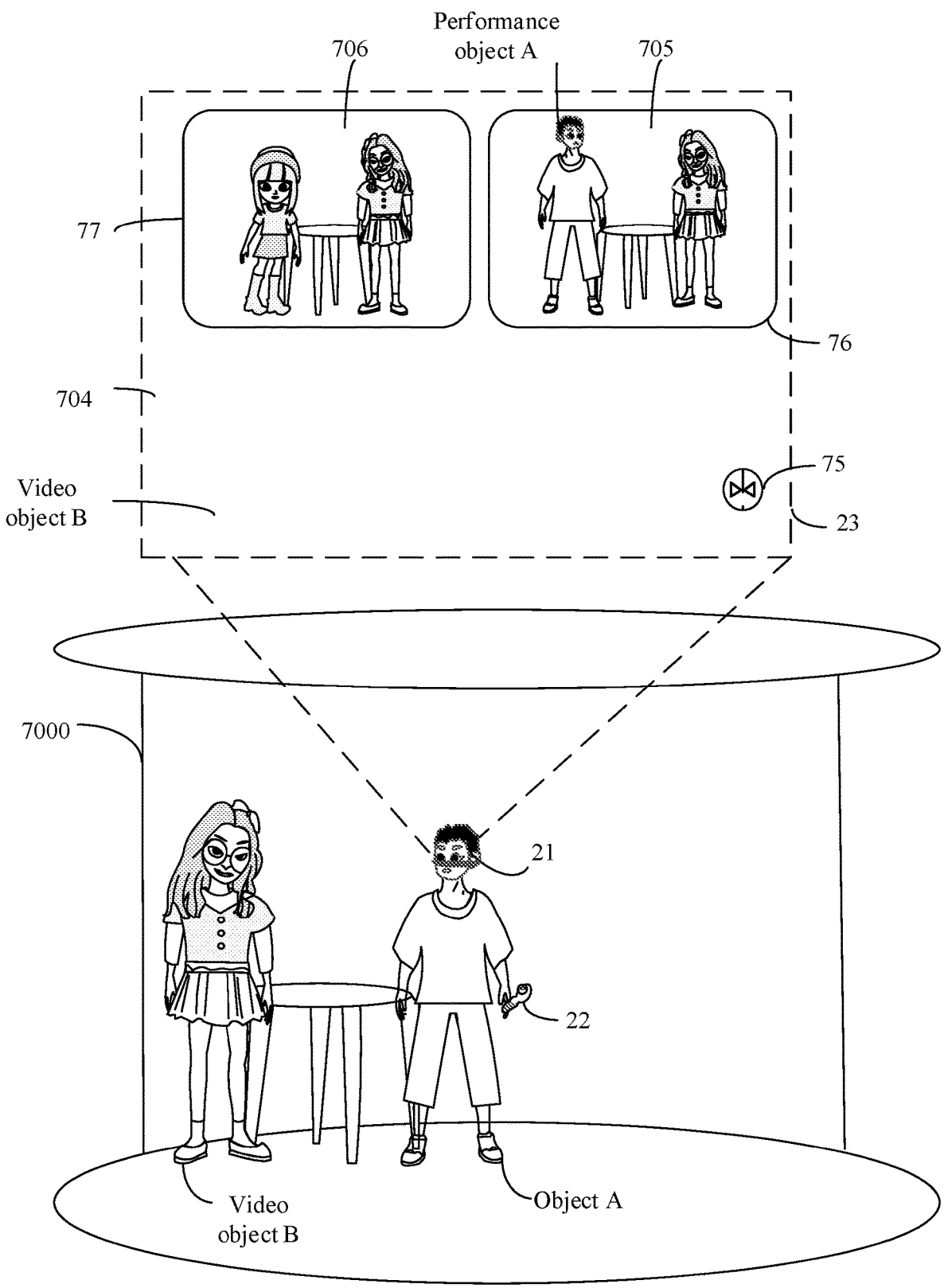
FIG. 7f is a schematic diagram of a VR-based mirror preview scene according to an example of the present subject matter.

FIG. 7f is a schematic diagram of a VR-based mirror preview scene according to an example of the present subject matter. Based on the VR-based scene shown in FIG. 7d, the object A may play the character corresponding to the video object C for performance in the virtual video space scene 7000 not including the video object C. It is assumed that the object A walks to a position of the video object C in the virtual video space scene 7000, that is, next to the video object B, and the virtual video space scene 7000 in the view of the object A is presented by a virtual video picture 704 displayed on the virtual display interface. As shown in FIG. 7f, in this case, the object A faces forward, and cannot see the video object B, and the object A also cannot see the performance of the object A in the virtual video space scene 7000, and thus does not know whether the generated created video can achieve an expected effect. Therefore, when obtaining the posture data and the figure data of the object A, the VR device 21 may display a mirror preview control 75 on the virtual display interface 23. When the object A triggers the mirror preview control 75 by using the VR handle 22, the VR device 21 may display a performance virtual video picture 705 in a performance preview region 76 on the virtual display interface 23. The performance virtual video picture 705 is a mirror picture of the virtual video space scene 7000 not including the video object C, and the object A in the view of the object A. A performance object A is generated based on the posture data and the figure data of the object A. For example, the VR device may further display a performance virtual video picture 706 in a comparison region 77. The performance virtual video picture 706 is a mirror picture of the virtual video space scene 7000 including the video object C in the view of the object A. The object A may view the performance virtual video picture 705 and the performance virtual video picture 706 to adjust the performance of the object A.

For example, the VR device may display a figure customization list on the virtual display interface, and update, in response to completing a configuration operation on the figure customization list, the figure data according to figure data that is configured, to obtain configured figure data. The configured figure data includes clothing data, body shape data, voice data, and appearance data. Then, the VR device may display the performance object in the created video by using a performed action and a performance figure. The performed action is determined based on the posture data of the first object. The performance figure is determined based on at least one of the clothing data, the body shape data, the voice data, and the appearance data. According to this example of the present subject matter, the first object may customize a figure for a performance object corresponding to a target performance character in the multi-view video. In this way, a simulation degree of the performance object may be improved, and a success rate of creation may be improved effectively. Therefore, the human-computer interaction efficiency is improved.

The clothing data is used for presenting clothing of the performance object. For example, the performance object presented according to the clothing data may be in a T-shirt, a shirt, trousers, a one-piece dress, or the like. The body shape data is used for presenting a body shape of the performance object. For example, the performance object presented according to the body shape data may be large in head and small in body, small in head and large in body, tall and thin, short and fat, or the like. The voice data is used for presenting a voice of the performance object. For example, the performance object presented according to the voice data may voice like a child, a young person, or the like. The appearance data is used for presenting an appearance of the performance object. The first object may customize the performance figure of the performance object associated with the first object in the created video.

The figure customization list includes a first figure customization list and a second figure customization list. The first figure customization list may include a character figure, an object figure, and a custom figure. The character figure is a figure of a video object corresponding to a character. The object figure is the figure of the first object. The custom figure is a universal figure provided by the VR device. The second figure customization list may include an object figure and a custom figure. When the first object performs as the target performance character appearing in the multi-view video, the first object may select to completely or partially replace the figure of the video object corresponding to the target performance character according to the first figure customization list, to obtain the performance figure of the performance object, for example, the clothing, the body shape, the appearance, or the voice. The target performance character may be a character that the first object intends to replace and that appears in the multi-view video at a target playing moment or a character that the first object intends to create and that does not appear in the multi-view video at a target playing moment when the first object performs in a virtual video space scene corresponding to the multi-view video at the target paying moment. When the first object performs as a new character, that is, a character that does not appear in the multi-view video, the first object may customize clothing, a body shape, an appearance, and a voice of a performance object corresponding to the new character by using the figure customization list, and there is just no character figure option.

Figure 7G:
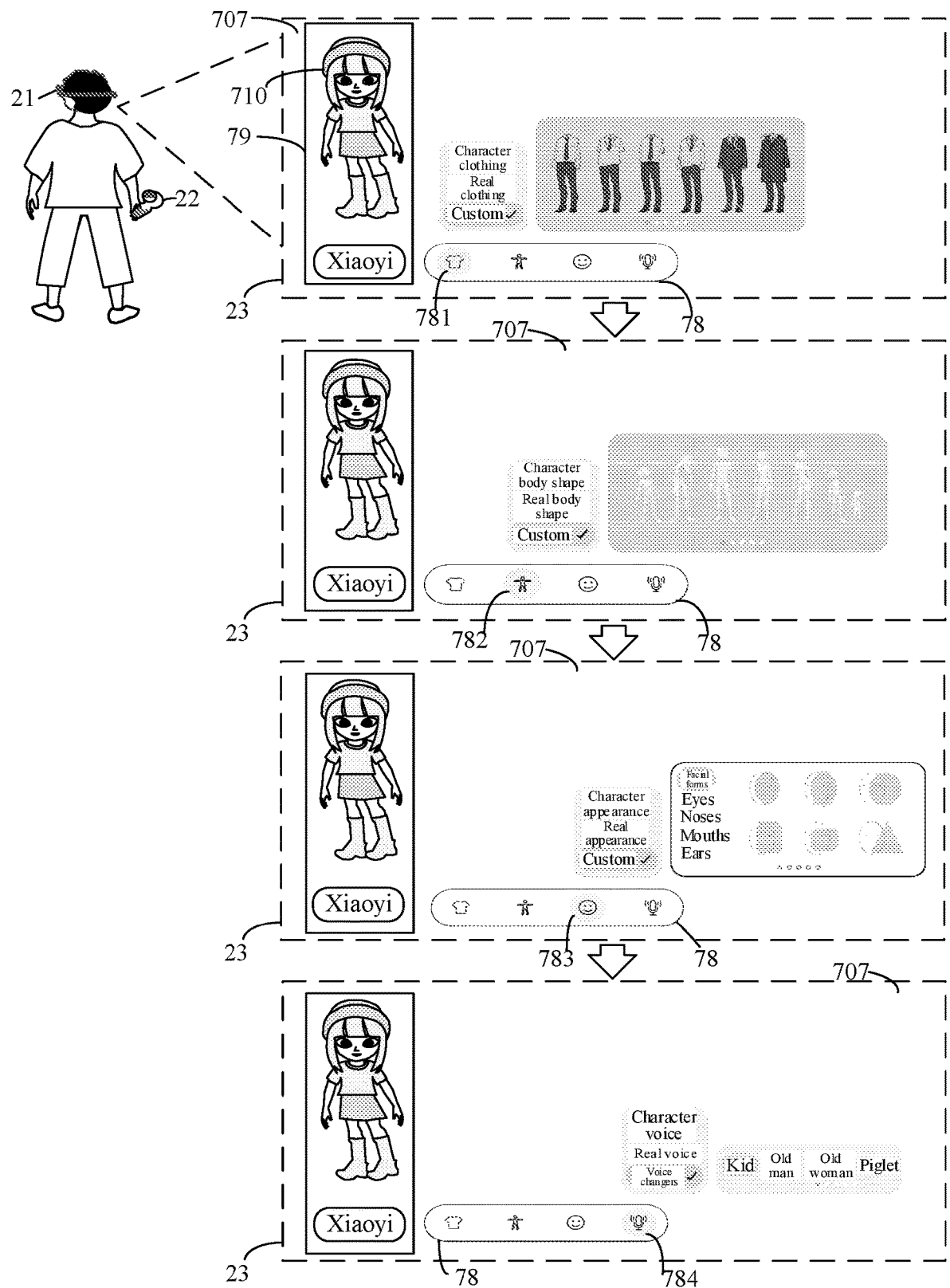
FIG. 7g is a schematic diagram of a first figure customization list according to an example of the present subject matter.

For ease of understanding a process in which the first object customizes the figure for the performance object corresponding to the target performance character in the multi-view video, an example in which the target performance character is the character Xiaoyi is used for description. FIG. 7g is a schematic diagram of the first figure customization list according to an example of the present subject matter. In the replaceable video object selection scene shown in FIG. 7b, after the VR device 21 determines the video object C corresponding to the character Xiaoyi as the character replacement object, and before the VR device 21 switches displaying of the virtual video picture 700 including the video object C to the virtual video picture 701 not including the video object C, the VR device 21 may first switch displaying of the virtual video picture 700 to a figure customization interface 707 for the character Xiaoyi. As shown in FIG. 7g, the figure customization interface 707 includes a first figure customization list 78 and a figure preview region 79. A preview performance object 710 is displayed in the figure preview region 79. An initial figure of the preview performance object 710 may be consistent with a figure of the video object C, or may be consistent with the figure of the object A. Then, the object A may adjust the figure of the preview performance object 710 based on the first figure customization list 78. When the object A completes a configuration operation on the first figure customization list 78, a figure of the preview performance object 710 is determined as a performance figure of a performance object corresponding to the character Xiaoyi in the created video. As shown in FIG. 7g, the first figure customization list 78 includes a clothing control 781, a body shape control 782, an appearance control 783, and a voice control 784. After the object A triggers the clothing control 781 by using the VR handle 22, the object A may select "Character clothing", and in this case, clothing of the preview performance object 710 is displayed to be that of the video object C corresponding to the character Xiaoyi. Alternatively, the object A may select "Real clothing", and in this case, clothing of the preview performance object 710 is displayed to be that of the object A. Alternatively, the object A may select "Custom" to select various types of preset clothing, and in this case, clothing of the preview performance object 710 is displayed to be preset clothing selected by the object A. Alternatively, the object A may perform free combination, that is, select "Character clothing" for some clothing, select "Real clothing" for some clothing, and select "Custom" for some clothing. After the object A triggers the body shape control 782 by using the VR handle 22, the object A may select "Character body shape", and in this case, a body shape of the preview performance object 710 is displayed to be that of the video object C. Alternatively, the object A may select "Real body shape", and in this case, a body shape of the preview performance object 710 is displayed to be that of the object A. Alternatively, the object A may select "Custom" to select various preset body shapes, and in this case, a body shape of the preview performance object 710 is displayed to be a preset body shape selected by the object A. The object A may perform partial or complete reshaping or height adjustment for the selected body shape. The VR device 21 may further recommend a body shape suitable for the character Xiaoyi. After the object A triggers the appearance control 783 by using the VR handle 22, the object A may select "Character appearance", and in this case, an appearance of the preview performance object 710 is displayed to be a face feature of the video object C. Alternatively, the object A may select "Real appearance", and in this case, an appearance of the preview performance object 710 is displayed to be a face feature of the object A. Alternatively, the object A may select "Custom" to select and combine various preset "facial forms, eyes, noses, mouses, ears, or the like", and in this case, an appearance of the preview performance object 710 is displayed to be a combined facial feature selected by the object A. For the appearances selected from "Real appearance" and "Custom", the object A may further perform partial reshaping, color, luster, and makeup adjustment, or the like. After the object A triggers the voice control 784 by using the VR handle 22, the object A may select "Character voice", and in this case, a voice feature of the preview performance object 710 is the same as that of the video object C. Alternatively, the object A may select "Real voice", and in this case, a voice feature of the preview performance object 710 is the same as that of the object A. Alternatively, the object A may select "Voice changer" to select various preset voice changing types for voice changing, and in this case, a voice feature of the preview performance object 710 is changed to a selected voice feature.

Figure 7H:
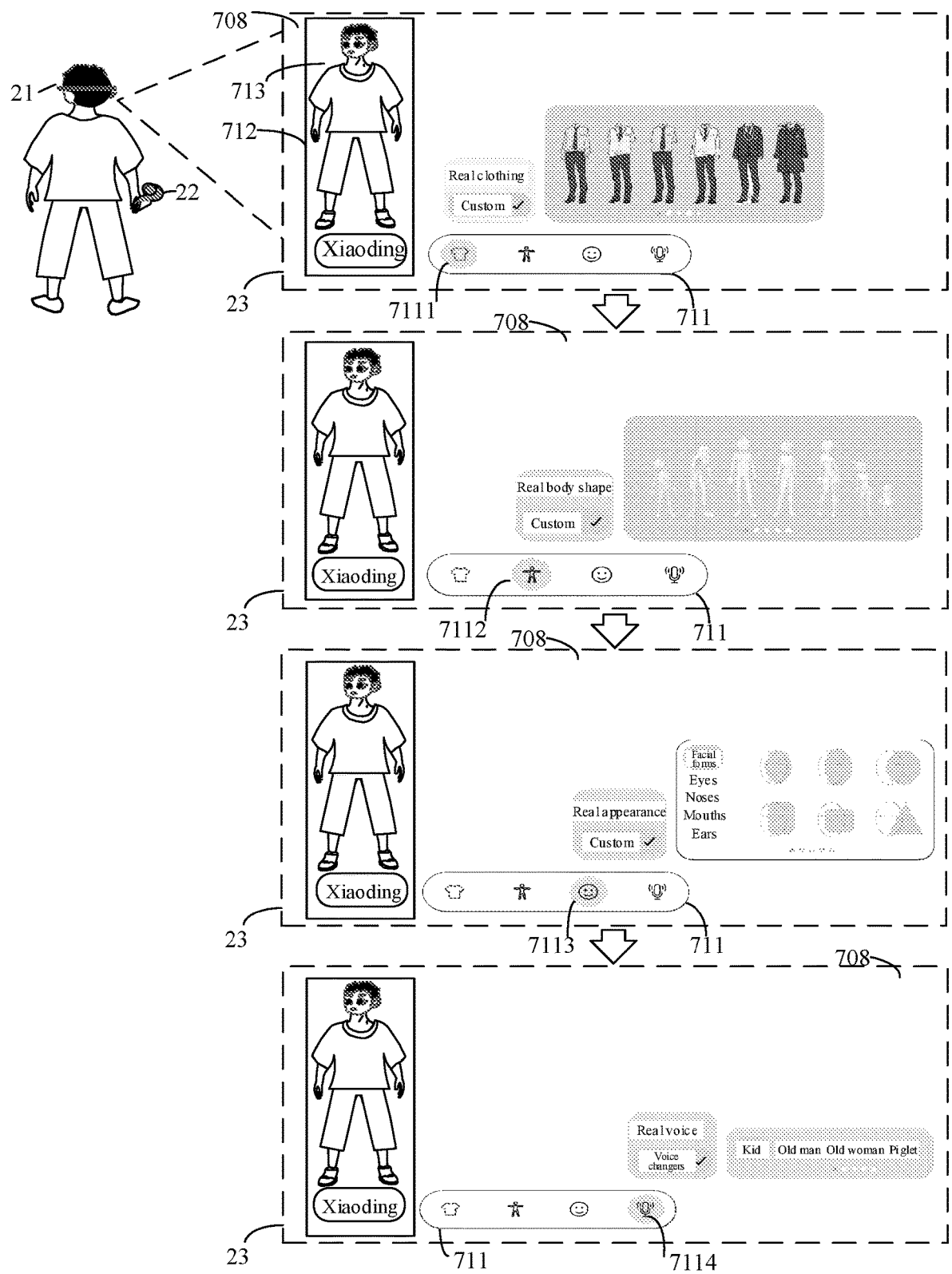
FIG. 7h is a schematic diagram of a second figure customization list according to an example of the present subject matter.

For ease of understanding a process in which the first object customizes a figure for the performance object corresponding to the new character in the multi-view video, an example in which the new character is Xiaoding is used for description. FIG. 7h is a schematic diagram of the second figure customization list according to an example of the present subject matter. Based on the scene shown in FIG. 7a, the object A intends to add the character Xiaoding to the multi-view video. After the VR device 21 responds to a trigger operation performed by the object A on the character creation control 712, as shown in FIG. 7h, the VR device 21 may display a figure customization interface 708 for the character Xiaoding on the virtual display interface. As shown in FIG. 7g, the figure customization list 708 includes a second figure customization list 711 and a figure preview region 712. A preview performance object 713 is displayed in the figure preview region 712. An initial figure of the preview performance object 713 may be consistent with the figure of the object A. Then, the object A may adjust the figure of the preview performance object 713 based on the second figure customization list 711. As shown in FIG. 7h, the second figure customization list 711 includes a clothing control 7111, a body shape control 7112, an appearance control 7113, and a voice control 7114. A difference of the second figure customization list 711 from the first figure customization list 78 lies in that an option corresponding to each control does not include an option related to a character figure, and a configuration of another option is the same as that in the first figure customization list 78. Elaborations are omitted herein.

For example, the VR device may display a shopping control on the virtual display interface, and display, in response to a trigger operation on the shopping control, an available virtual item according to a second display mode. The second display mode is different from a display mode of the available virtual item before triggering of the shopping control. The available virtual item is an item presented in the virtual video space scene. Then, the VR device may determine a selected available virtual item as a to-be-purchased item in response to a selection operation on the available virtual item, and display purchase information corresponding to the to-be-purchased item on the virtual display interface. According to this example of the present subject matter, the available virtual item may be highlighted to prompt the user in a purchase process, so that the human-computer interaction efficiency is improved.

Figure 7I:
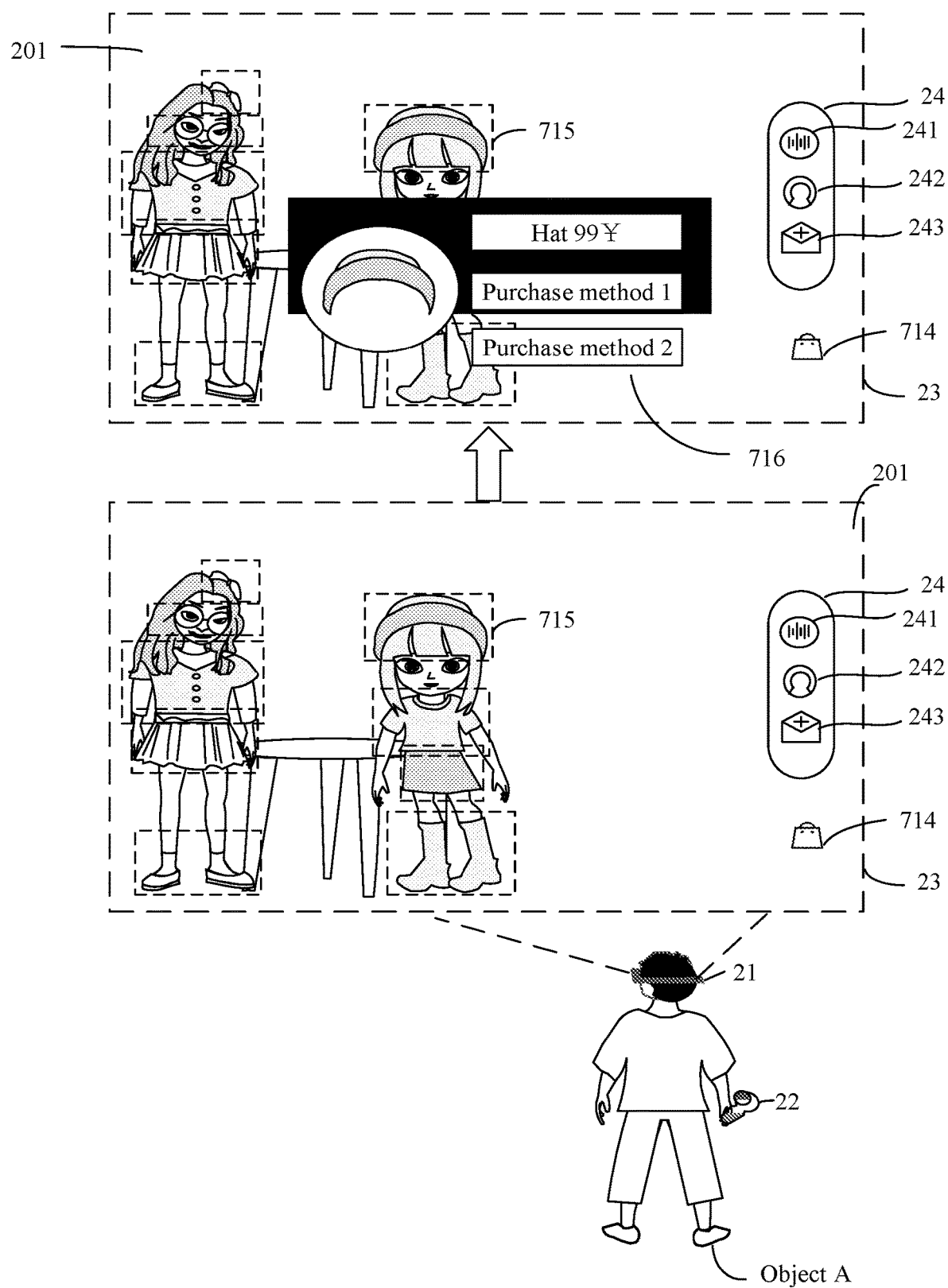
FIG. 7i is a schematic diagram of an available virtual item display scene according to an example of the present subject matter.

FIG. 7i is a schematic diagram of an available virtual item display scene according to an example of the present subject matter. As shown in FIG. 7i, based on the scene shown in FIG. 2a, the VR device 21 may further independently display a shopping control 714 on the virtual display interface 23. When the object A triggers the shopping control 714 by using the VR handle 22, the VR device 21 may highlight the available virtual item (for example, box the available virtual item by using a dashed box). As shown in FIG. 7i, the available virtual item includes a virtual hat 715 and the like. The object A may select an available virtual item that the object A wants to know about. If the object A selects the virtual hat 715, the VR device 21 may display purchase information 716 to tell the object A about a price, a purchase method, or the like of a real hat corresponding to the virtual hat 715.

By using the method provided in this example of the present subject matter, the first object may play the character in the multi-view video in the virtual video space scene corresponding to the multi-view video, or add the new character, to obtain the created video. In this way, the presentation modes of the multi-view video may be enriched.

Figure 8:
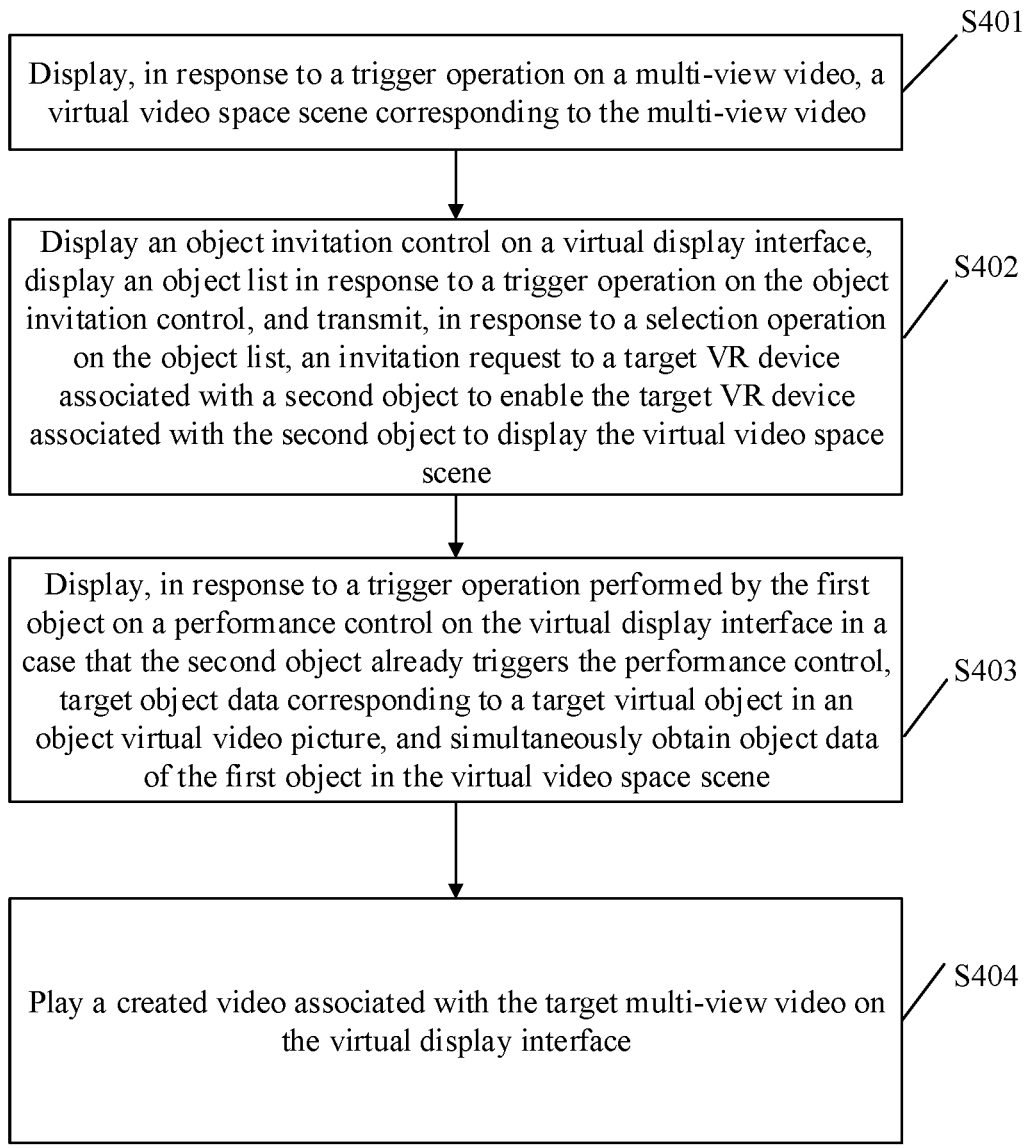
FIG. 8 is a schematic flowchart of a data processing method for VR-based multi-object video creation according to an example of the present subject matter.

Refer to FIG. 8 to better understand a process in FIG. 3 that the VR device obtains, in response to the scene editing operation for object invitation, the object data of the first object in the virtual video space scene, obtains the object data of the second object, and then obtains the created video according to the object data of the first object and the object data of the second object. FIG. 8 is a schematic flowchart of a data processing method for VR-based multi-object video creation according to an example of the present subject matter. The data processing method may be performed by the VR device. For ease of understanding, an example in which the method is performed by the VR device is used for description in this example of the present subject matter. The data processing method may include at least the following step S401 to step S403.

Step S401: Display, in response to the trigger operation on the multi-view video, the virtual video space scene corresponding to the multi-view video.

For implementation of step S401, refer to step S101 in the example corresponding to FIG. 3.

Step S402: Display an object invitation control on the virtual display interface, display an object list in response to a trigger operation on the object invitation control, and transmit, in response to a selection operation on the object list, an invitation request to a target VR device associated with the second object to enable the target VR device associated with the second object to display the virtual video space scene. The object list includes an object in association with the first object. According to this example of the present subject matter, the second object may be invited to enter the virtual video space scene, so that interaction efficiency may be improved.

The first object may select to invite at least one second object to perform scene creation on the multi-view video together. In this case, a low-latency long-connection network is set up between virtual VR devices of the first object and the second object.

A possible implementation process in which the VR device transmits, in response to the selection operation on the object list, the invitation request to the target VR device associated with the second object to enable the target VR device associated with the second object to display the virtual video space scene may be as follows: initiating, in response to the selection operation on the object list, the invitation request for the second object to a server to enable the server to transmit the invitation request to the target VR device associated with the second object, the target VR device displaying the virtual video space scene in a case that the target VR device accepts the invitation request; and displaying a target virtual object in an object virtual video picture in a case that the target VR device accepts the invitation request and displays the virtual video space scene, the second object entering the virtual video space scene by using the target virtual object, the target virtual object being associated with figure data of the second object, and the object virtual video picture is used for presenting the virtual video space scene in the view of the first object.

Figure 9A:
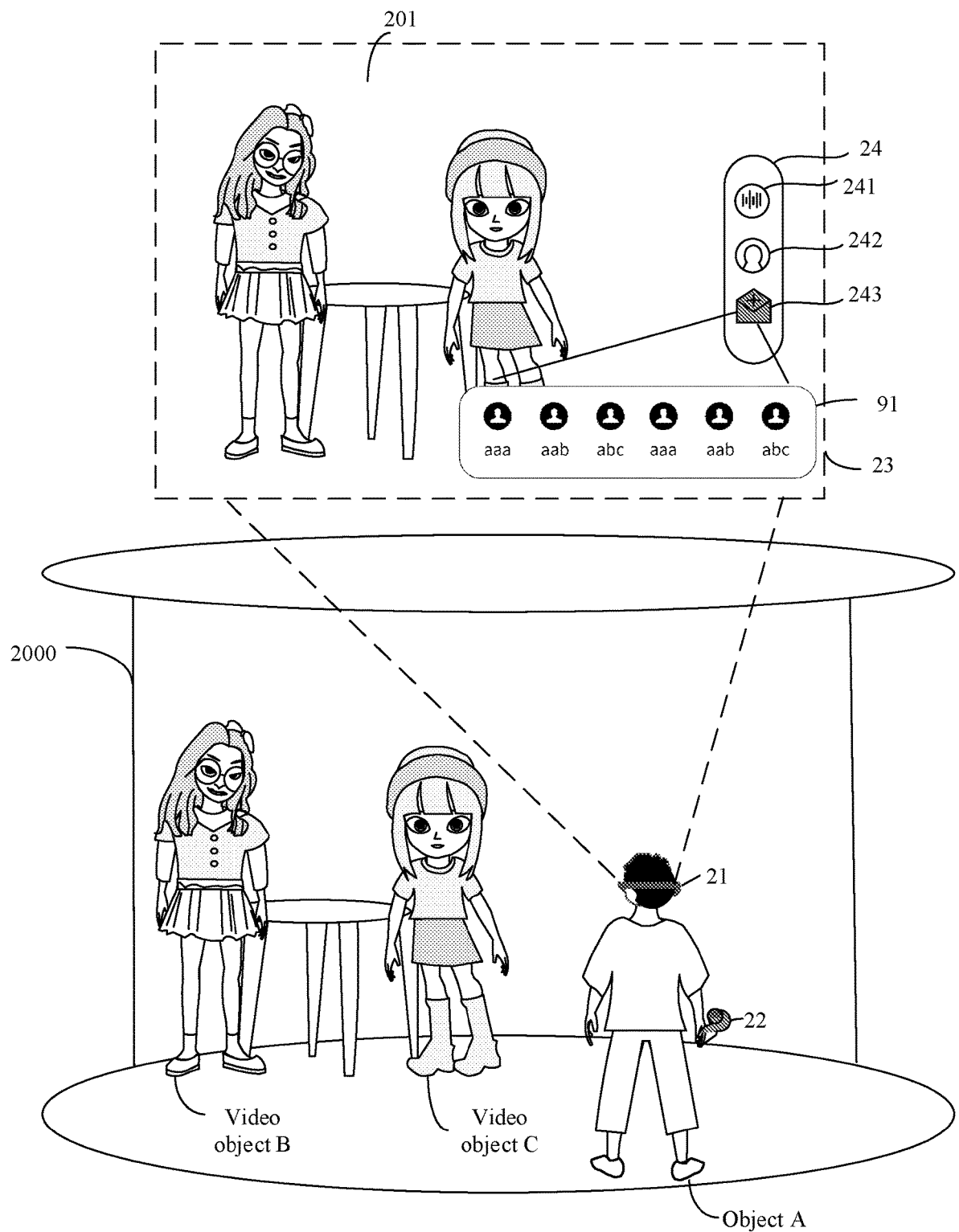
FIG. 9a is a schematic diagram of a VR-based object invitation according to an example of the present subject matter.

FIG. 9a is a schematic diagram of a VR-based object invitation scene according to an example of the present subject matter. Based on the scene shown in FIG. 2a, if the object A selects the object invitation control 243 by using the VR handle 22, the VR device 21 may display an object list 91 on the virtual display interface 23 in response to a trigger operation on the object invitation control 243. The object list 91 includes an object with a friend relationship with the object A, for example, an object aaa and an object aab. The object A may select, by using the VR handle 22, a second object that the object A intends to invite, for example, the object aaa. The VR device 21 may initiate an invitation request for the object aaa to the server in response to a selection operation on the object aaa.

Figure 9B:
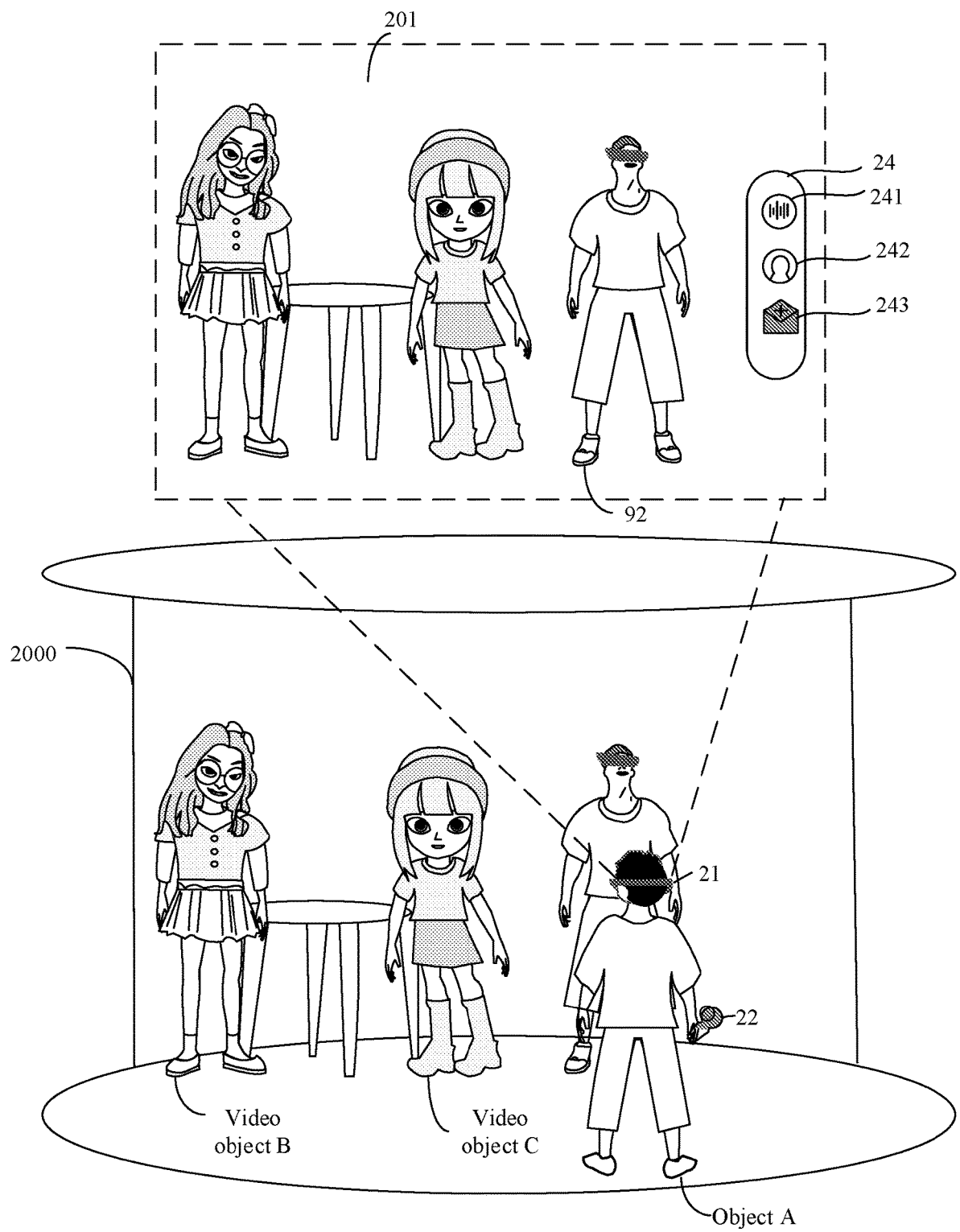
FIG. 9b is a schematic diagram of a scene in which a second object is displayed based on VR according to an example of the present subject matter.

FIG. 9b is a schematic diagram of a scene in which the second object is displayed based on VR according to an example of the present subject matter. As shown in FIG. 9b, the object aaa may wear the target VR device and a target VR handle. The object aaa may accept the invitation request of the object A by using the target VR handle. The target VR device may obtain figure data of the object aaa in response to an accepting operation performed by the object aaa on the invitation request, and then enter the virtual video space scene 2000 corresponding to the multi-view video. That is, the virtual video space scene 2000 corresponding to the multi-view video is displayed in the target VR device. The target VR device may share the figure data of the object aaa to the VR device 21. Therefore, the VR device 21 may generate a target virtual object 92 with a same figure as the object aaa according to the figure data of the object aaa. Then, the VR device 21 may display the target virtual object 92 in the view of the object A in the virtual video picture 201. In addition, the target VR device may further obtain posture data, voice data, and the like of the object aaa in real time as target object data to present an action, an expression, and a voice of the object aaa, and share the obtained target object data to the VR device 21 in real time. The VR device 21 may simulate and present the action, the expression, and the voice of the object aaa in real time by using the target virtual object 92 according to the target object data. It is to be understood that the VR device 21 may further obtain object data of the object A, and share the object data to the target VR device, such that the target VR device displays a VR object associated with the object A on the virtual display interface, and simulates and presents an action, an expression, and a voice of the object A by using the VR object associated with the object A.

For example, the first object and the second object may have an instant conversation in a form of a voice, a text, or the like in the virtual video space scene by using VR objects associated with the first object and the second object. When the second object speaks, a VR device with a binding relationship with the second object may obtain instant voice data of the second object, and then share the instant voice data to the VR device. Then, the VR device may play a voice of the second object according to the instant voice data of the second object. In addition, the VR device may further display a conversation message corresponding to the target virtual object in the object virtual video picture. The conversation message is generated based on the instant voice data of the second object.

Step S403: Display, in response to the trigger operation performed by the first object on the performance control on the virtual display interface in a case that the second object already triggers the performance control, target object data corresponding to the target virtual object in the object virtual video picture, and simultaneously obtain the object data of the first object in the virtual video space scene.

The target virtual object is associated with the figure data of the second object.

In the virtual video space scene corresponding to the multi-view video, the first object and the second object may perform at the same time. The VR device may obtain the object data of the first object. The VR device with the binding relationship with the second object may obtain the target object data of the second object. The VR device with the binding relationship with the second object may share the target object data to the VR device. For obtaining of the object data and the target object data, refer to descriptions in the examples corresponding to FIG. 4 and FIG. 6, and elaborations are omitted herein.

Step S404: Play the created video associated with the multi-view video on the virtual display interface. The created video includes the performance object associated with the first object and the target virtual object. The performance object in the created video is presented based on the object data. The target virtual object in the created video is presented based on the target object data.

The VR device with a binding relationship with the first object fuses the object data, the target object data, and the virtual video space scene, thereby obtaining the created video completed collaboratively by a plurality of objects. In a process in which the VR device with the binding relationship with the first object obtains the object data of the first object in the virtual video space scene, the virtual video space scene is shot in a collaborative performance view to obtain a collaborative performance video, and then a performance object with performance object data and the target virtual object with collaborative performance object data are fused into the collaborative performance video, thereby obtaining the created video. The performance object data is data presented by the object data in the collaborative performance view. The collaborative performance object data is data presented by the target object data in a performance view.

By using the method provided in this example of the present subject matter, the first object may invite the second object to perform scene creation in the same virtual video space scene. In this way, the presentation modes of the multi-view video and the interaction modes are further enriched.

Figure 10:
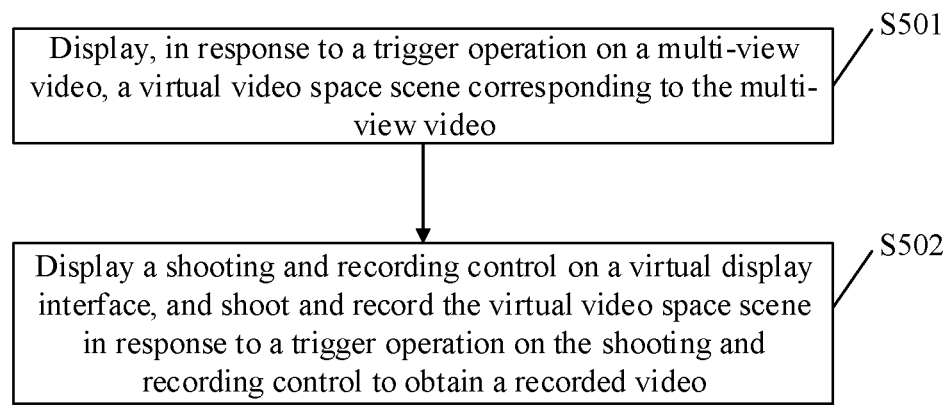
FIG. 10 is a schematic flowchart of a data processing method for VR-based video recording according to an example of the present subject matter.

FIG. 10 is a schematic flowchart of a data processing method for VR-based video recording according to an example of the present subject matter. The data processing method may be performed by a VR device. For ease of understanding, an example in which the method is performed by the VR device is used for description in this example of the present subject matter. The data processing method may include at least the following step S501 and step S502.

Step S501: Display, in response to a trigger operation on a multi-view video, a virtual video space scene corresponding to the multi-view video.

When the VR device displays the virtual video space scene corresponding to the multi-view video, the VR device may display a master shot virtual video picture on the virtual display interface by default. In this case, a first object wearing the VR device perceives the virtual video space scene corresponding to the multi-view video, and sees a virtual video space scene in a master shot view. The VR device may determine a current view of the first object as the master shot view. The first object switches the view any time by using the VR device to view the virtual video space scene from different views.

Figure 11A:
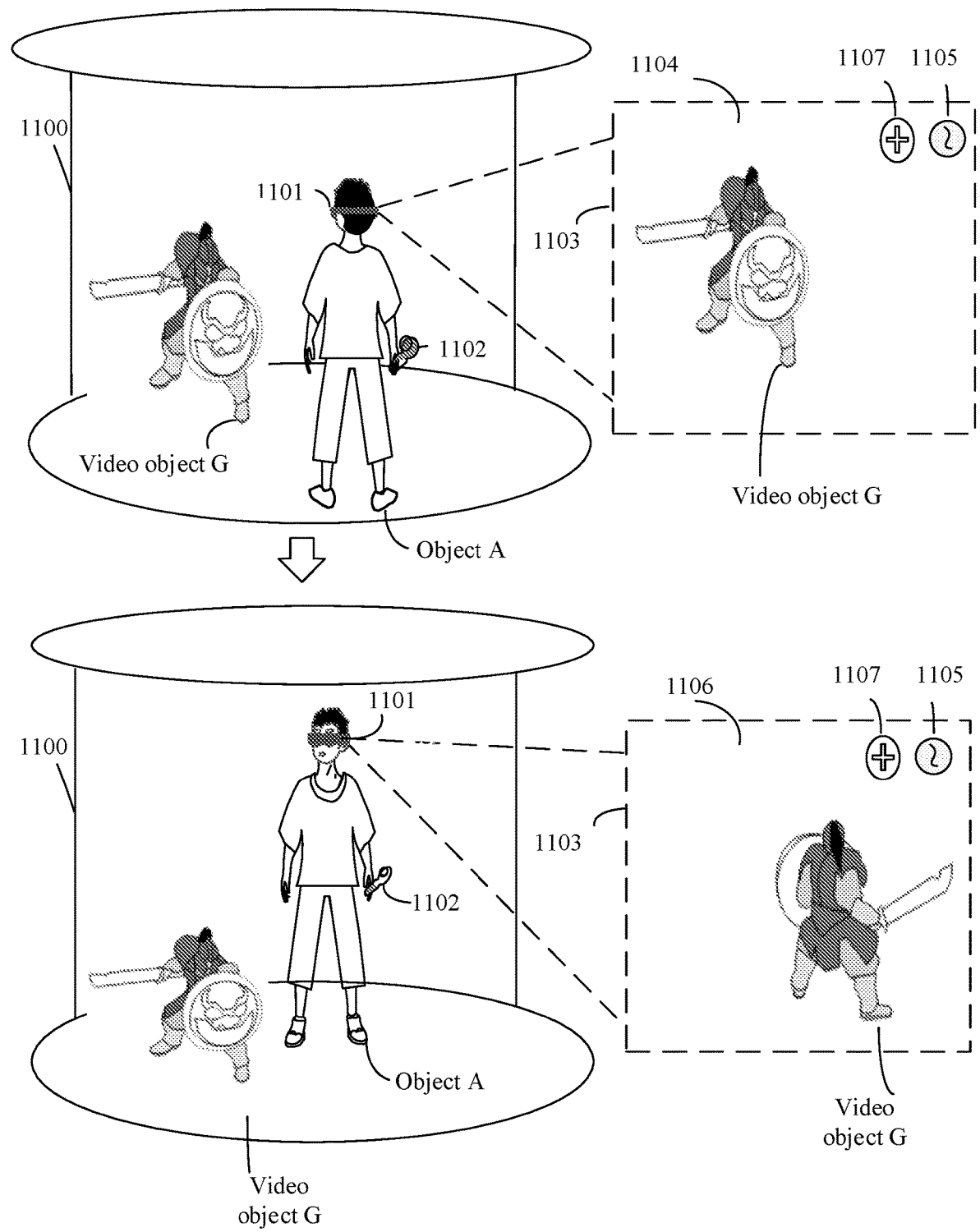
FIG. 11a is a schematic diagram of a VR-based moving view switching scene according to an example of the present subject matter.

For example, the VR device may display a moving view switching control on a virtual display interface. Then, the VR device may obtain, in response to a trigger operation on the moving view switching control, a view of the first object after movement for the virtual video space scene as a moving view, and then switch displaying of the master shot virtual video picture to a moving virtual video picture of the virtual video space scene in the moving view. That is, after the first object triggers the moving view switching control, the first object may walk freely in the perceived virtual video space scene to view the virtual video space scene corresponding to the multi-view video in 360 degrees. FIG. 11a is a schematic diagram of a VR-based moving view switching scene according to an example of the present subject matter. As shown in FIG. 11a, it is assumed that an object A perceives a virtual video space scene 1100 by using a VR device 1101, and the virtual video space scene 1100 includes a video object G. In this case, the VR device 1101 may display a virtual video picture 1104 on a virtual display interface 1103 to present a virtual video space scene 1100 in a view of the object A. For example, the object A may see a front of the video object G. The VR device 1101 may display a moving view switching control 1105 on the virtual display interface 1103. When the object A walks to change a viewing angle for the virtual video space scene 1103, the object A may trigger the moving view switching control 1105 by using a VR handle 1102, and then the object A may walk. The VR device 1101 may obtain a view of the first object after movement for the virtual video space scene 1100 as a moving view, and then obtain a virtual video picture for presenting a virtual video space scene 1100 in the moving view. For example, the object A walks in the virtual video space scene 1100 from the front of the video object G to the rear of the video object G. As shown in FIG. 11a, in this case, the VR device 1101 may display a virtual video picture 1106 on the virtual display interface 1103. It can be learned that the object A currently can see only a back of the video object G.

Figure 11B:
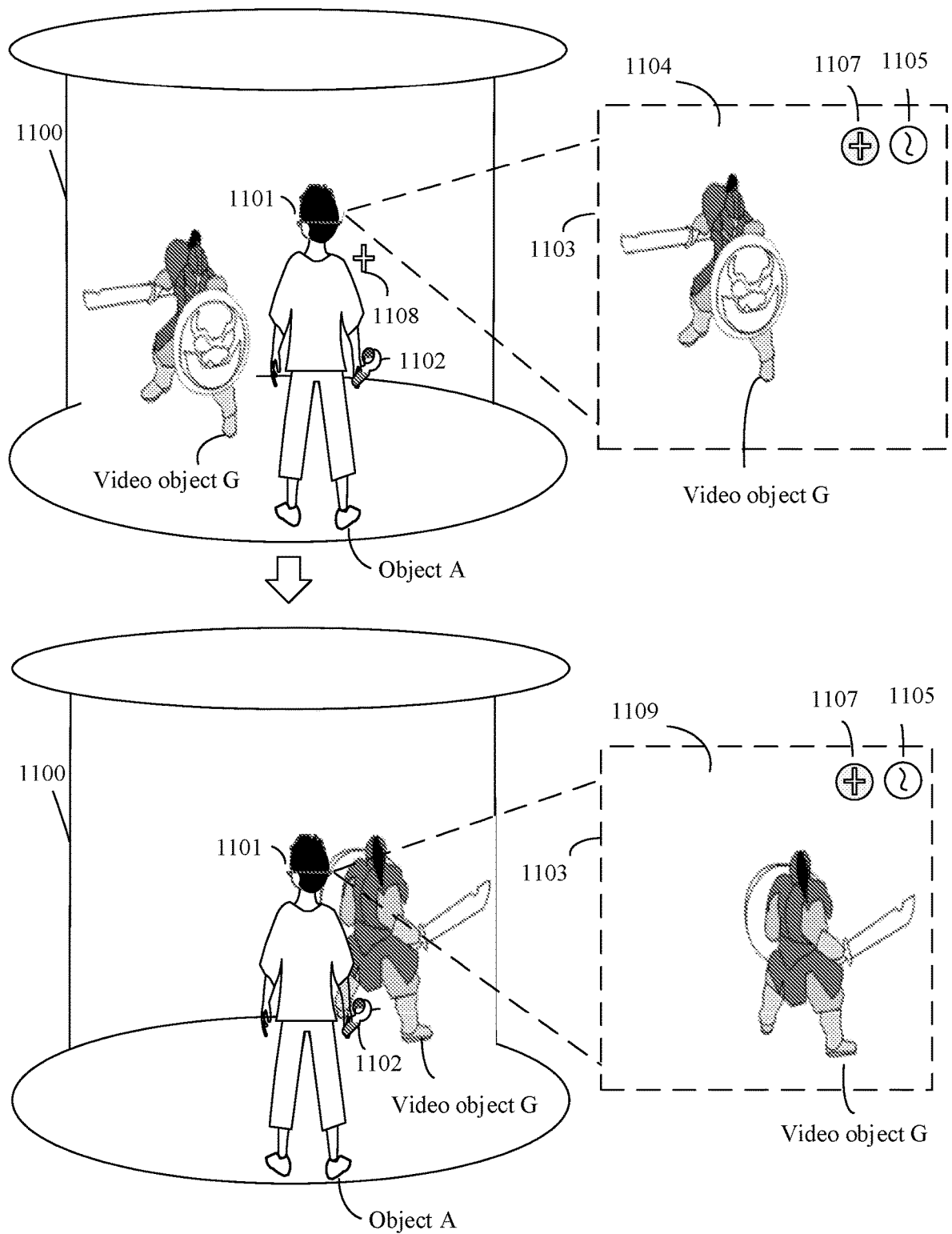
FIG. 11b is a schematic diagram of a VR-based fixed-point view switching scene according to an example of the present subject matter.

For example, the VR device may display a fixed-point view switching control on a virtual display interface. The VR device may display a fixed-point cursor on the virtual display interface in response to a trigger operation on the fixed-point view switching control. The VR device may obtain, in response to a movement operation on a fixed-point cursor, a view of the fixed-point cursor after movement for the virtual video space scene as a fixed-point view, and then switch displaying of the master shot virtual video picture to a fixed-point virtual video picture of the virtual video space scene in the fixed-point view. That is, the first object may adjust a viewing angle for the virtual video space scene by using the fixed-point cursor without walking. FIG. 11b is a schematic diagram of a VR-based fixed-point view switching scene according to an example of the present subject matter. In the scene shown in FIG. 11a, the VR device 1101 may further display a fixed-point view switching control 1107 on the virtual display interface 1103. After the VR device 1101 responds to a trigger operation on the fixed-point view switching control 1107, the object A may see a fixed-point cursor 1108 in the virtual video space scene. If the object A moves the fixed-point cursor 1108 to the rear of the video object G by using the VR handle 1102, the VR device 1101 may obtain a view of the fixed-point cursor 1108 for the virtual video space scene as a fixed-point view, and then obtain a virtual video picture 1109 for presenting a virtual video space scene 1100 in the fixed-point view. As shown in FIG. 11*b*, a position of the object A remains unchanged, but a position of the virtual video space scene perceived by the object A changes, and the object A sees the virtual video space scene 1100 in the fixed-point view.

Step S502: Display a shooting and recording control on the virtual display interface, and shoot and record the virtual video space scene in response to a trigger operation on the shooting and recording control to obtain a recorded video.

Figure 11C:
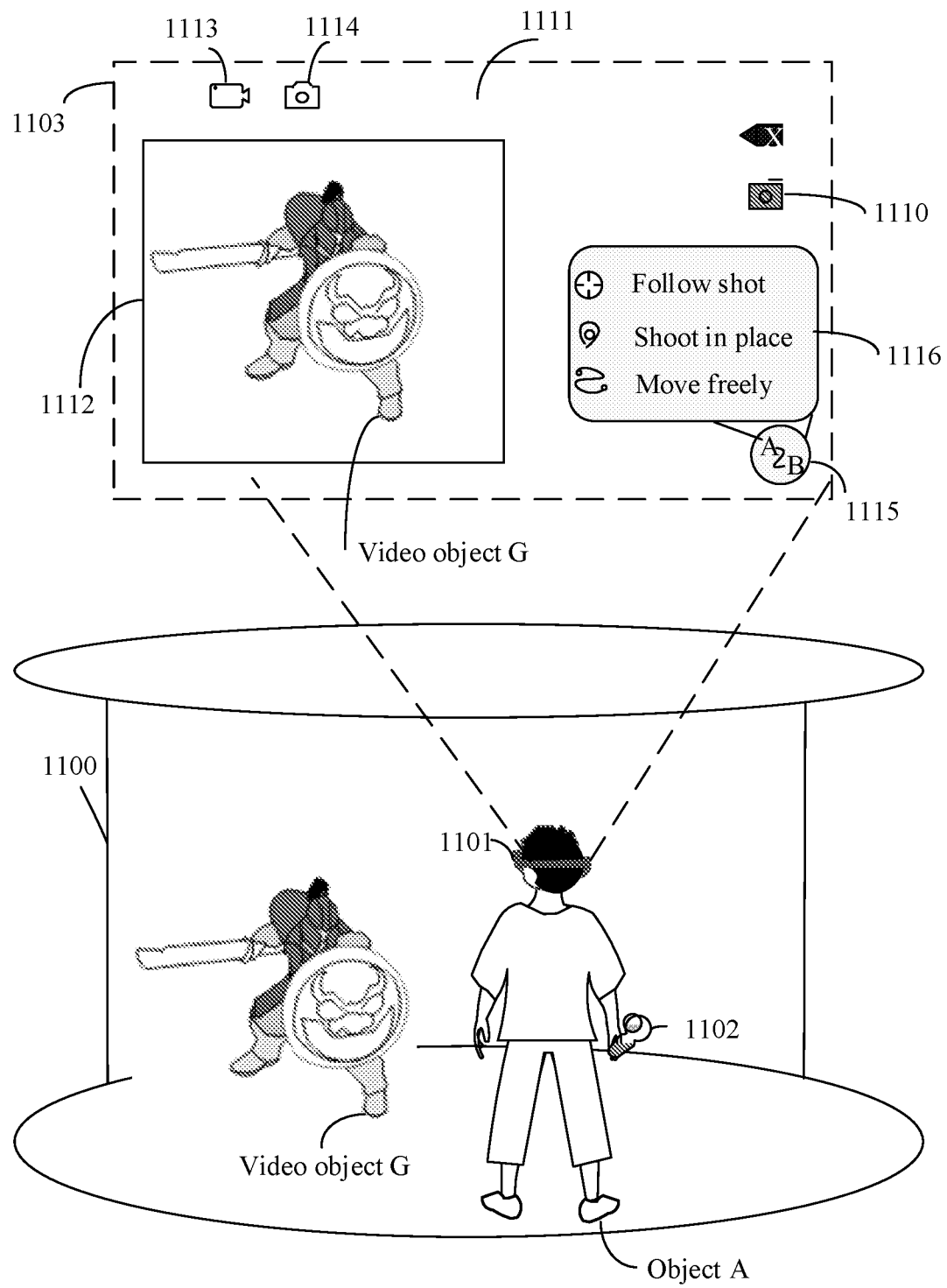
FIG. 11c is a schematic diagram of a VR-based video shooting scene according to an example of the present subject matter.

A possible implementation process in which the VR device shoots and records the virtual video space scene in response to the trigger operation on the shooting and recording control to obtain the recorded video may be as follows: the VR device obtains a shooting view for the virtual video space scene in response to the trigger operation on the shooting and recording control. Then, the VR device may display, on the virtual display interface, a shot virtual video picture of the virtual video space scene in the shooting view, display a recorded picture box in the shot virtual video picture, and record a video picture of the shot virtual video picture in the recorded picture box to obtain the recorded video. Like determining of the foregoing performance view, determining of the shooting view corresponds to three determining manners, that is, following shot, shooting in place, and moving freely. FIG. 11*c* is a schematic diagram of a VR-based video shooting scene according to an example of the present subject matter. The VR device 1101 may perform picture shooting or clip recording on the virtual video space scene 1100. As shown in FIG. 11*c*, the VR device 1101 may display a shooting and recording control 1110 on the virtual display interface 1103. The VR device 1101 may display a shot virtual video picture 1111 of the virtual video space scene 1110 in the shooting view in response to a trigger operation on the shooting and recording control 1110, and display a recorded picture box 1112. It may be understood that only a picture in the recorded picture box 1112 may be recorded, and the object A may adjust a size and a position of the recorded picture box 1112. The object A may perform picture shooting by triggering a shooting control 1113, and perform clip recording by triggering a recording control 1114. In addition, the object A may trigger a path selection control 1115. The VR device may display a path selection list 1116 in response to a trigger operation on the path selection control 1115. The path selection list 1116 includes three shooting paths: following shot, shooting in place, and moving freely. For example, the first object may add a plurality of shots and shooting paths for picture recording without mutual interference.

By using the method provided in this example of the present subject matter, the first object may select the shooting view to shoot and record the virtual video space scene to obtain the created video whose master shot view is the shooting view. In this way, presentation modes of the multi-view video and interaction modes are enriched.

Figure 12:
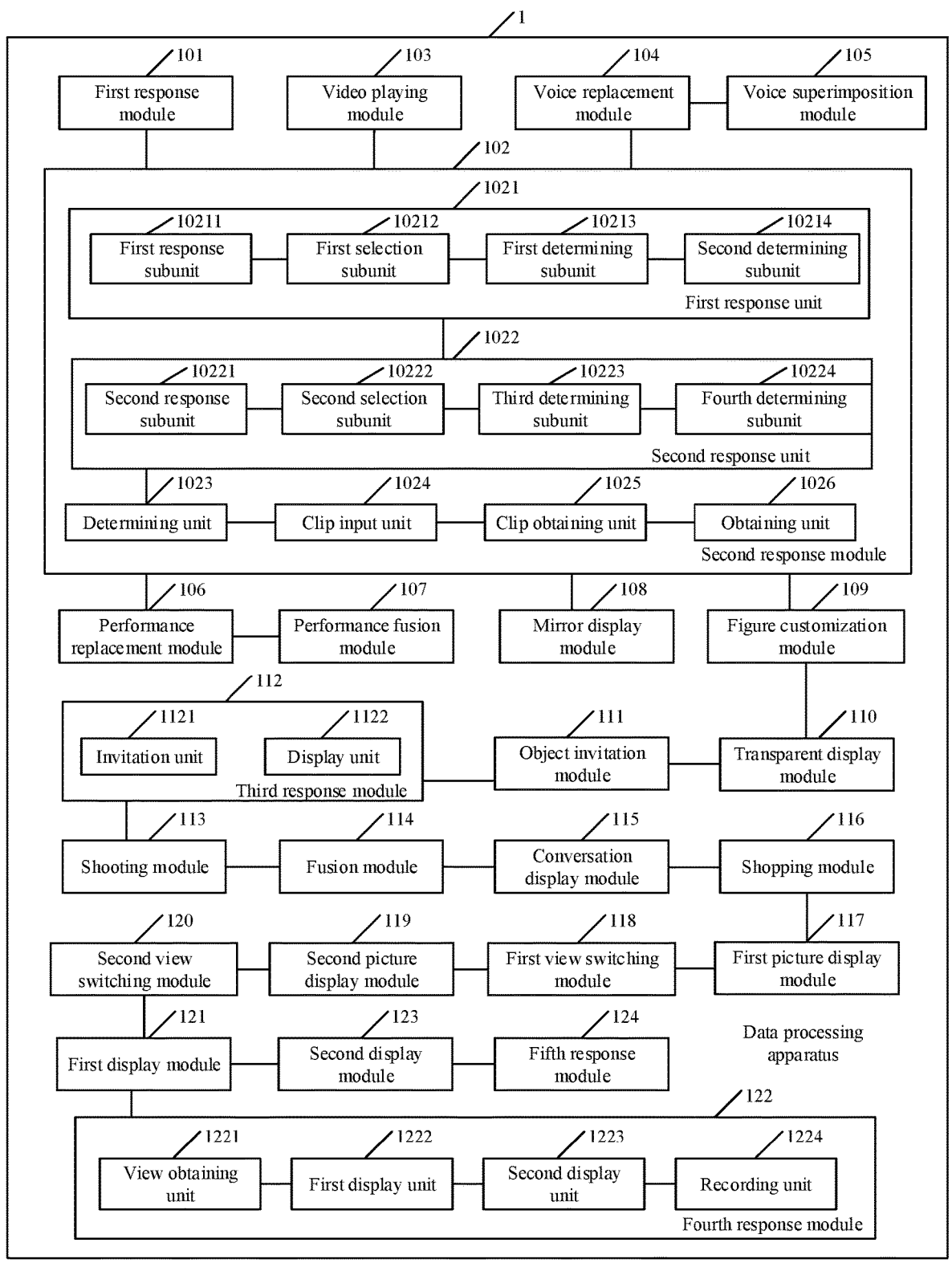
FIG. 12 is a schematic diagram of a structure of a data processing apparatus according to an example of the present subject matter.

FIG. 12 is a schematic diagram of a structure of a data processing apparatus according to an example of the present subject matter. The data processing apparatus may be a computer program (including program code) run in a computer device. For example, the data processing apparatus is application software. The apparatus may be configured to perform the corresponding steps in the data processing method provided in the examples of the present subject matter. As shown in FIG. 12, the data processing apparatus 1 may include a first response module 101, a second response module 102, and a video playing module 103. The first response module 101 is configured to display, in response to a trigger operation on a multi-view video, a virtual video space scene corresponding to the multi-view video. The second response module 102 is configured to obtain object data of a first object in the virtual video space scene in response to a scene editing operation on the virtual video space scene. The first object is an object that initiates the trigger operation on the multi-view video. The video playing module 103 is configured to play a created video associated with the multi-view video on a virtual display interface. The created video is obtained by performing editing processing on the virtual video space scene based on the object data.

For specific implementations of the first response module 101, the second response module 102, and the video playing module 103, refer to the descriptions about step S101 to step S103 in the example corresponding to FIG. 3, and elaborations are omitted herein.

In some examples, the scene editing operation includes a trigger operation on a dubbing control on the virtual display interface. Referring back to FIG. 12, the second response module 102 includes a first response unit 1021. The first response unit 1021 is configured to: play the multi-view video; and obtain voice data of the first object in the virtual video space scene in response to the trigger operation on the dubbing control on the virtual display interface, and determine the voice data of the first object as the object data applied to the multi-view video.

For a specific implementation of the first response unit 1021, refer to the descriptions about step S102 in the example corresponding to FIG. 3, and elaborations are omitted herein.

In some examples, the voice data of the first object includes object voice data or background voice data. Referring back to FIG. 12, the first response unit 1021 includes a first response subunit 10211, a first selection subunit 10212, a first determining subunit 10213, and a second determining subunit 10214. The first response subunit 10211 is configured to display a dubbing mode list. The dubbing mode list includes an object dubbing control and a background dubbing control. The first selection subunit 10212 is configured to display a dubbable video object in response to a selection operation on the object dubbing control, and determine a selected dubbable video object as a to-be-dubbed object in response to a selection operation on the dubbable video object. The dubbable video object is a video object presented in the multi-view video. The first determining subunit 10213 is configured to obtain, during playing of the multi-view video, the object voice data of the first object based on the to-be-dubbed object, and determine the object voice data as the object data. The second determining subunit 10214 is configured to obtain, during playing of the multi-view video in response to a selection operation on the background dubbing control, the background voice data of the first object, and determine the background voice data as the object data.

For specific implementations of the first response subunit 10211, the first selection subunit 10212, the first determining subunit 10213, and the second determining subunit 10214, refer to the descriptions about step S201 to step S207 in the example corresponding to FIG. 4, and elaborations are omitted herein.

In some examples, the first determining subunit 10213 is further configured to: perform muting processing on video voice data corresponding to the to-be-dubbed object; display, in a case that the to-be-dubbed object is in a vocalizing state, text information and sound track information that correspond to the video voice data, and obtain the object voice data of the first object; and determine the object voice data as the object data.

Referring back to FIG. 12. The data processing apparatus 1 further includes a voice replacement module 104 and a voice superimposition module 105. The voice replacement module 104 is configured to perform, in a case that the object data is the object voice data, replacement processing on video voice data corresponding to the to-be-dubbed object in the multi-view video by using the object voice data, to obtain the created video. The voice superimposition module 105 is configured to superimpose, in a case that the object data is the background voice data, the background voice data to the multi-view video, to obtain the created video.

For specific implementations of the voice replacement module 104 and the voice superimposition module 105, refer to the descriptions about step S201 to step S207 in the example corresponding to FIG. 4, and elaborations are omitted herein.

In some examples, the scene editing operation includes a trigger operation on a performance control on the virtual display interface. Referring back to FIG. 12, the second response module 102 includes a second response unit 1022. The second response unit 1022 is configured to: play the multi-view video; and obtain posture data and figure data of the first object in the virtual video space scene in response to the trigger operation on the performance control on the virtual display interface, and determine the posture data and the figure data as the object data applied to the multi-view video. The created video includes a performance object associated with the first object. The performance object in the created video is presented based on the posture data and the figure data.

For a specific implementation of the second response unit 1022, refer to the descriptions about step S102 in the example corresponding to FIG. 3, and elaborations are omitted herein.

Referring back to FIG. 12. The second response unit 1022 includes a second response subunit 10221, a second selection subunit 10222, a third determining subunit 10223, and a fourth determining subunit 10224. The second response subunit 10221 is configured to display a performance mode list. The performance mode list includes a character replacement control and a character creation control. The second selection subunit 10222 is configured to display a replaceable video object in response to a trigger operation on the character replacement control, and determine a selected replaceable video object as a character replacement object in response to a selection operation on the replaceable video object. The replaceable video object is a video object presented in the multi-view video. The third determining subunit 10223 is configured to obtain, during playing of the multi-view video, the posture data and the figure data of the first object based on the character replacement object, and determine the posture data and the figure data as the object data. The fourth determining subunit 10224 is configured to obtain, during playing of the multi-view video in response to a trigger operation on the character creation control, the posture data and the figure data of the first object, and determine the posture data and the figure data as the object data.

For specific implementations of the second response subunit 10221, the second selection subunit 10222, the third determining subunit 10223, and the fourth determining subunit 10224, refer to the descriptions about step S301 to step S307 in the example corresponding to FIG. 6, and elaborations are omitted herein.

Referring back to FIG. 12. The data processing apparatus 1 further includes a performance replacement module 106 and a performance fusion module 107. The performance replacement module 106 is configured to cancel, in a case that the object data is obtained by triggering the character replacement control, displaying of the character replacement object in a performance-view video, and fuse the performance object that complies with performance object data into the performance-view video, to obtain the created video. The performance-view video is obtained by shooting the virtual video space scene in a performance view during playing of the multi-view video after triggering of the performance control. The performance object data is data presented by the object data in the performance view. The performance fusion module 107 is configured to fuse, in a case that the object data is obtained by triggering the character creation control, the performance object that complies with performance object data into a performance-view video, to obtain the created video.

For specific implementations of the performance replacement module 106 and the performance fusion module 107, refer to the descriptions about step S301 to step S307 in the example corresponding to FIG. 6, and elaborations are omitted herein.

In some examples, the second selection subunit 10222 is further configured to: determine, in response to the trigger operation on the character replacement control, a video object currently displayed in an object virtual video picture as the replaceable video object, display, in response to a marking operation on the replaceable video object, a marked replaceable video object according to a first display mode, the first display mode is different from a display mode of a video object other than the replaceable video object, and determine the marked replaceable video object as the character replacement object. The object virtual video picture is used for presenting a virtual video space scene in a view of the first object.

In some examples, the second selection subunit 10222 is further configured to: display at least one video clip corresponding to the multi-view video in response to the trigger operation on the character replacement control, display a video object in a selected video clip in response to a selection operation on the at least one video clip, determine the video object in the selected video clip as the replaceable video object, display, in response to a marking operation on the replaceable video object, a marked replaceable video object according to a first display mode, the first display mode is different from a display mode of a video object other than the replaceable video object, and determine the marked replaceable video object as the character replacement object.

Referring back to FIG. 12. The data processing apparatus 1 further includes a mirror display module 108. The mirror display module 108 is configured to display a mirror preview control on the virtual display interface during obtaining of the posture data and the figure data of the first object. The mirror display module 108 is further configured to display a performance virtual video picture in a performance preview region on the virtual display interface in response to a trigger operation on the mirror preview control. The performance virtual video picture includes the performance object fused into the virtual video space scene.

For a specific implementation of the mirror display module 108, refer to the descriptions about an optional example in the example corresponding to FIG. 6, and elaborations are omitted herein.

Referring back to FIG. 12. The data processing apparatus 1 further includes a figure customization module 109. The figure customization module 109 is configured to display a figure customization list on the virtual display interface. The figure customization module 109 is further configured to update, in response to completing a configuration operation on the figure customization list, the figure data according to figure data that is configured, to obtain configured figure data. The configured figure data includes clothing data, body shape data, and appearance data. The figure customization module 109 is further configured to display the performance object in the created video by using a performed action and a performance figure. The performed action is determined based on the posture data of the first object. The performance figure is determined based on at least one of the clothing data, the body shape data, voice data, and the appearance data.

For a specific implementation of the figure customization module 109, refer to the descriptions about an optional example in the example corresponding to FIG. 6, and elaborations are omitted herein.

Referring back to FIG. 12. The data processing apparatus 1 further includes a transparent display module 110. The transparent display module 110 is configured to display a replacement transparency input control for the character replacement object on the virtual display interface. The transparent display module 110 is further configured to obtain input transparency information for the character replacement object in response to an input operation on the transparency input control, perform transparency update displaying on the character replacement object on the virtual display interface according to the transparency information, and display a position cursor of the character replacement object after transparency update in the virtual video space scene.

For a specific implementation of the transparent display module 110, refer to the descriptions about an optional example of step S304 in the example corresponding to FIG. 6, and elaborations are omitted herein.

Referring back to FIG. 12. The data processing apparatus 1 further includes an object invitation module 111 and a third response module 112. The object invitation module 111 is configured to display an object invitation control on the virtual display interface, and display an object list in response to a trigger operation on the object invitation control. The object list includes an object in association with the first object. The third response module 112 is configured to transmit, in response to a selection operation on the object list, an invitation request to a target VR device associated with a second object to enable the target VR device associated with the second object to display the virtual video space scene.

For specific implementations of the object invitation module 111 and the third response module 112, refer to the descriptions about step S402 in the example corresponding to FIG. 8, and elaborations are omitted herein.

Referring back to FIG. 12. The third response module 112 includes an invitation unit 1121 and a display unit 1122. The invitation unit 1121 is configured to initiate the invitation request for the second object to a server to enable the server to transmit the invitation request to the target VR device associated with the second object. The target VR device displays the virtual video space scene in a case that the target VR device accepts the invitation request. The display unit 1122 is configured to display a target virtual object in an object virtual video picture in a case that the target VR device accepts the invitation request and displays the virtual video space scene. The second object enters the virtual video space scene by using the target virtual object. The target virtual object is associated with figure data of the second object. The object virtual video picture is used for presenting the virtual video space scene in the view of the first object.

For specific implementations of the invitation unit 1121 and the display unit 1122, refer to the descriptions about step S402 in the example corresponding to FIG. 8, and elaborations are omitted herein.

In some examples, in a case that the second object already triggers the performance control, the scene editing operation includes a trigger operation performed by the first object on a performance control on the virtual display interface. Referring back to FIG. 12, the second response module 102 includes a determining unit 1023. The determining unit 1023 is configured to: display, in response to the trigger operation performed by the first object on the performance control on the virtual display interface, target object data corresponding to the target virtual object in the object virtual video picture, and obtain the object data of the first object in the virtual video space scene. The created video includes a performance object associated with the first object and the target virtual object. The performance object in the created video is presented based on the object data. The target virtual object in the created video is presented based on the target object data.

For a specific implementation of the determining unit 1023, refer to the descriptions about step S403 in the example corresponding to FIG. 8, and elaborations are omitted herein.

Referring back to FIG. 12. The data processing apparatus 1 further includes a shooting module 113 and a fusion module 114. The shooting module 113 is configured to, during obtaining of the object data of the first object in the virtual video space scene, shoot the virtual video space scene in a collaborative performance view to obtain a collaborative performance video. The fusion module 114 is configured to fuse a performance object with performance object data and the target virtual object with collaborative performance object data into the collaborative performance video to obtain the created video. The performance object data is data presented by the object data in the collaborative performance view. The collaborative performance object data is data presented by the target object data in a performance view.

For specific implementations of the shooting module 113 and the fusion module 114, refer to the descriptions about step S403 in the example corresponding to FIG. 8, and elaborations are omitted herein.

Referring back to FIG. 12. The data processing apparatus 1 further includes a conversation display module 115. The conversation display module 115 is configured to display a conversation message corresponding to the target virtual object in the object virtual video picture. The conversation message is generated based on instant voice data of the second object.

For a specific implementation of the conversation display module 115, refer to the descriptions about an optional example of step S403 in the example corresponding to FIG. 8, and elaborations are omitted herein.

Referring back to FIG. 12. The data processing apparatus 1 further includes a shopping module 116. The shopping module 116 is configured to display a shopping control on the virtual display interface, and display, in response to a trigger operation on the shopping control, an available virtual item according to a second display mode. The second display mode is different from a display mode of the available virtual item before triggering of the shopping control. The available virtual item is an item presented in the virtual video space scene. The shopping module 116 is configured to determine a selected available virtual item as a to-be-purchased item in response to a selection operation on the available virtual item, and display purchase information corresponding to the to-be-purchased item on the virtual display interface.

For a specific implementation of the shopping module 116, refer to the descriptions about an optional example in the example corresponding to FIG. 6, and elaborations are omitted herein.

Referring back to FIG. 12. The data processing apparatus 1 further includes a first picture display module 117 and a first view switching module 118. The first picture display module 117 is configured to display a master shot virtual video picture of the virtual video space scene in a master shot view on the virtual display interface. The first view switching module 118 is configured to display a moving view switching control on the virtual display interface. The first view switching module 118 is further configured to obtain, in response to a trigger operation on the moving view switching control, a view of the first object after movement for the virtual video space scene as a moving view. The first view switching module 118 is further configured to switch displaying of the master shot virtual video picture to a moving virtual video picture of the virtual video space scene in the moving view.

For specific implementations of the first picture display module 117 and the first view switching module 118, refer to the descriptions about step S501 in the example corresponding to FIG. 10, and elaborations are omitted herein.

Referring back to FIG. 12. The data processing apparatus 1 further includes a second picture display module 119 and a second view switching module 120. The second picture display module 119 is configured to display a master shot virtual video picture of the virtual video space scene in a master shot view on the virtual display interface. The second view switching module 120 is configured to display a fixed-point view switching control on the virtual display interface. The second view switching module 120 is further configured to display a fixed-point cursor on the virtual display interface in response to a trigger operation on the fixed-point view switching control. The second view switching module 120 is further configured to obtain, in response to a movement operation on the fixed-point cursor, a view of the fixed-point cursor after movement for the virtual video space scene as a fixed-point view. The second view switching module 120 is further configured to switch displaying of the master shot virtual video picture to a fixed-point virtual video picture of the virtual video space scene in the fixed-point view.

For specific implementations of the second picture display module 119 and the second view switching module 120, refer to the descriptions about step S501 in the example corresponding to FIG. 10, and elaborations are omitted herein.

Referring back to FIG. 12. The data processing apparatus 1 further includes a first display module 121 and a fourth response module 122. The first display module 121 is configured to display a shooting and recording control on the virtual display interface. The fourth response module 122 is configured to shoot and record the virtual video space scene in response to a trigger operation on the shooting and recording control to obtain a recorded video.

For specific implementations of the first display module 121 and the fourth response module 122, refer to the descriptions about step S502 in the example corresponding to FIG. 10, and elaborations are omitted herein.

Referring back to FIG. 12. The fourth response module 122 includes a view obtaining unit 1221, a first display unit 1222, a second display unit 1223, and a recording unit 1224. The view obtaining unit 1221 is configured to obtain a shooting view for the virtual video space scene in response to the trigger operation on the shooting and recording control. The first display unit 1222 is configured to display a shot virtual video picture of the virtual video space scene in the shooting view on the virtual display interface. The second display unit 1223 is configured to display a recorded picture box in the shot virtual video picture. The recording unit 1224 is configured to record a video picture of the shot virtual video picture in the recorded picture box to obtain the recorded video.

For specific implementations of the view obtaining unit 1221, the first display unit 1222, the second display unit 1223, and the recording unit 1224, refer to the descriptions about step S502 in the example corresponding to FIG. 10, and elaborations are omitted herein.

Referring back to FIG. 12. The second response module 102 includes a clip input unit 1024, a clip obtaining unit 1025, and an obtaining unit 1026. The clip input unit 1024 is configured to display a video clip input control for the virtual video space scene on the virtual display interface in response to the scene editing operation performed by the first object on the virtual video space scene. The clip obtaining unit 1025 is configured to obtain input clip progress information for the multi-view video in response to an input operation on the video clip input control, and determine a video clip indicated by the clip progress information as a to-be-created video clip. The obtaining unit 1026 is configured to obtain the object data of the first object in the virtual video space scene during playing of the to-be-created video clip.

For specific implementations of the clip input unit 1024, the clip obtaining unit 1025, and the obtaining unit 1026, refer to the descriptions about step S103 in the example corresponding to FIG. 3, and elaborations are omitted herein.

Referring back to FIG. 12. The data processing apparatus 1 further includes a second display module 123 and a fifth response module. The second display module 123 is configured to display a playing progress control bar on the virtual display interface during playing of the to-be-created video clip. The playing progress control bar includes a pause control, a start control, and a multiple control. The fifth response module 124 is configured to pause playing of the to-be-created video clip in response to a trigger operation on the pause control. Alternatively, the fifth response module is configured to continue playing the to-be-created video clip in response to a trigger operation on the start control. Alternatively, the fifth response module is configured to adjust, in response to a selection operation on the multiple control, a playing speed of the to-be-created video clip according to a selected playing multiple.

For specific implementations of the second display module 123 and the fifth response module, refer to the descriptions in the example corresponding to FIG. 3, and elaborations are omitted herein.

Figure 13:
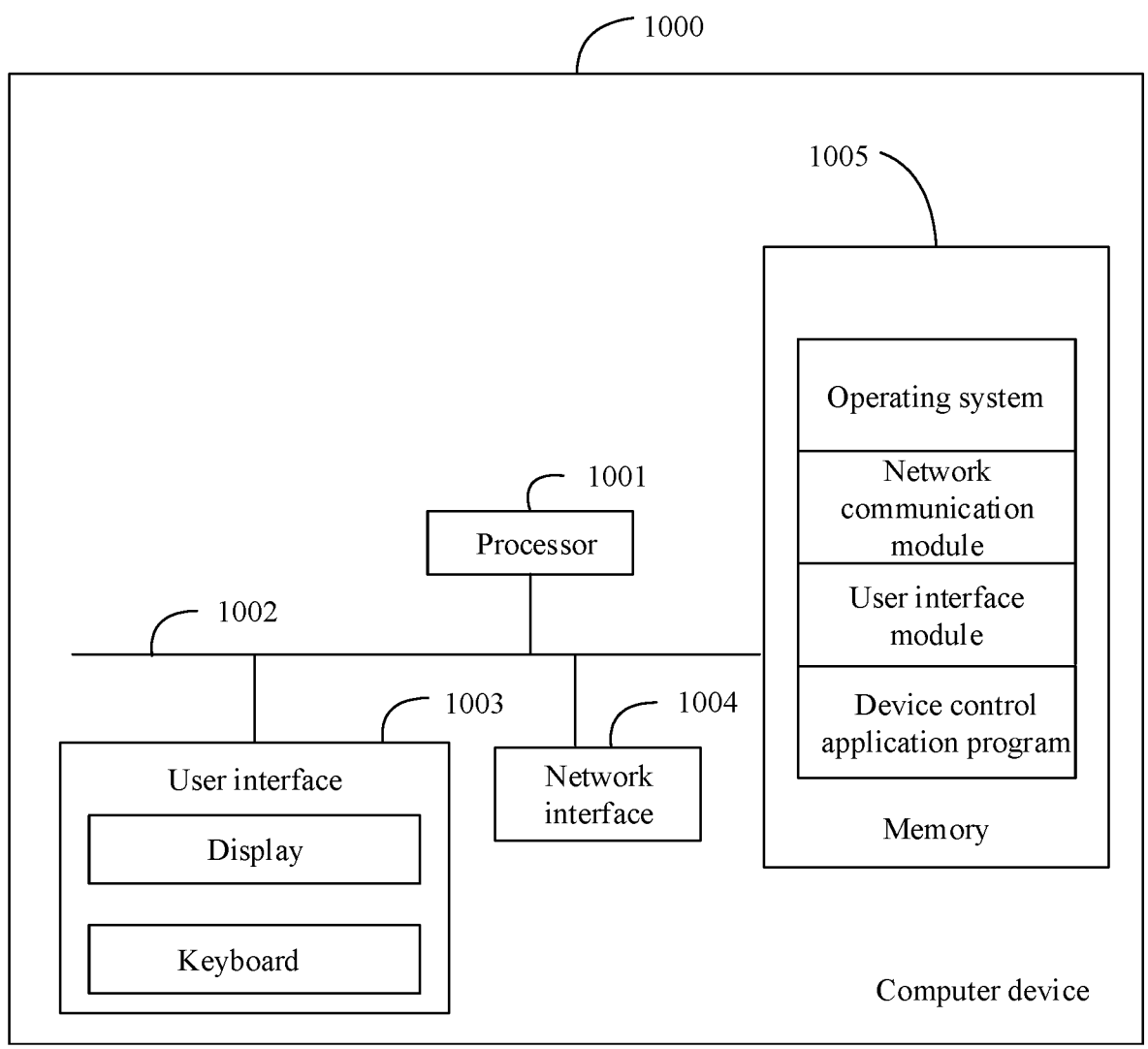
FIG. 13 is a schematic diagram of a structure of a computer device according to an example of the present subject matter.

FIG. 13 is a schematic diagram of a structure of a computer device according to an example of the present subject matter. As shown in FIG. 13, the computer device 1000 may include a processor 1001, a network interface 1004, and a memory 1005. In addition, the computer device 1000 may further include a user interface 1003 and at least one communication bus 1002. The communication bus 1002 is configured to implement connection and communication between these components. The user interface 1003 may include a display and a keyboard. Optionally, the user interface 1003 may further include a standard wired interface and wireless interface. For example, the network interface 1004 may include a standard wired interface and wireless interface (for example, a wireless fidelity (Wi-Fi) interface). The memory 1005 may be a high-speed random access memory (RAM), or a non-volatile memory, for example, at least one disk memory. For example, the memory 1005 may alternatively be at least one storage apparatus far away from the processor 1001. As shown in FIG. 13, as a non-transitory computer-readable storage medium, the memory 1005 may include an operating system, a network communication module, a user interface module, and a device control application program.

In the computer device 1000 shown in FIG. 13, the network interface 1004 may provide a network communication network element. The user interface 1003 is mainly configured to provide an input interface for a user. The processor 1001 may be configured to invoke the device control application program stored in the memory 1005 to implement the following steps: displaying, in response to a trigger operation on a multi-view video, a virtual video space scene corresponding to the multi-view video, and playing the multi-view video in the virtual video space scene; obtaining object data of a first object in the virtual video space scene in response to a scene editing operation on the virtual video space scene, the first object is an object that initiates the trigger operation on the multi-view video; and playing a created video associated with the multi-view video on a virtual display interface, the created video is obtained by performing editing processing on the virtual video space scene based on the object data.

It is to be understood that the computer device 1000 described in this example of the present subject matter may execute the descriptions about the data processing method in any one of the foregoing corresponding examples. Elaborations are omitted herein. In addition, beneficial effects of the same method are not described herein again.

In addition, an example of the present subject matter also provides a non-transitory computer-readable storage medium. The computer-readable storage medium stores a computer program executed by the data processing apparatus 1 mentioned above. The computer program includes program instructions. The processor, when executing the program instructions, may execute the descriptions about the data processing method in any one of the foregoing corresponding examples. Therefore, elaborations are omitted herein. In addition, beneficial effects of the same method are not described herein again. For technical details that are not disclosed in the example of the computer-readable storage medium involved in the present subject matter, refer to the descriptions in the method examples of the present subject matter.

The computer-readable storage medium may be an internal storage unit of the data processing apparatus or the computer device provided in any one of the foregoing examples, for example, a hard disk or an internal memory of the computer device. The computer-readable storage medium may alternatively be an external storage device of the computer device, for example, a plug-in hard disk, a smart media card (SMC), a secure digital (SD) card, or a flash card on the computer device. The computer-readable storage medium may alternatively include both an internal storage unit and an external storage device of the computer device. The computer-readable storage medium is configured to store the computer program and another program and data that are required by the computer device. The computer-readable storage medium may further be configured to temporarily store data that has been output or is to be output.

In addition, an example of the present subject matter also provides a computer program product or computer program. The computer program product or computer program includes computer instructions. The computer instructions are stored in a non-transitory computer-readable storage medium. A processor of a computer device reads the computer instructions from the computer-readable storage medium. The processor executes the computer instructions to enable the computer device to perform the method provided in any one of the foregoing corresponding examples.

Terms "first", "second", and the like in the specification, the claims, and the drawings in the examples of the present subject matter are used to distinguish between different objects rather than describe a specific sequence. In addition, the terms "include", "have", and any variant thereof are intended to cover non-exclusive inclusion. For example, a process, method, apparatus, product, or device including a series of steps or units is not limited to the listed steps or modules, but may optionally further include steps or modules that are not listed, or optionally further include other steps or units that are intrinsic to the process, the method, the apparatus, the product, or the device.

A person of ordinary skill in the art may be aware that the units and the algorithm steps in the examples described with reference to the examples disclosed in this specification can be implemented by electronic hardware, computer software, or a combination thereof. To clearly describe interchangeability between hardware and software, the foregoing has generally described compositions and steps of the examples based on network elements. Whether these network elements are executed by hardware or software depends on specific applications and design constraints of the technical solutions. A person skilled in the art may use different methods to implement the described network elements for each particular application, but it is not to be considered that the implementation goes beyond the scope of the present subject matter.

The term module (and other similar terms such as unit, subunit, submodule, etc.), as used herein, may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The above is merely the preferred example of the present subject matter and certainly not intended to limit the scope of the present subject matter. Therefore, equivalent variations made according to the claims of the present subject matter also fall within the scope of the present subject matter.

The invention claimed is:

1. A data processing method performed by a computer device, comprising:
    displaying, in response to a trigger operation on a multi-view video, a virtual video space scene corresponding to the multi-view video;
    obtaining object data of a first object in the virtual video space scene in response to a scene editing operation on the virtual video space scene, wherein the first object is an object that initiates the trigger operation on the multi-view video, wherein the scene editing operation comprises a trigger operation on a dubbing control on the virtual display interface, and wherein the obtaining object data of the first object comprises:
playing the multi-view video;
obtaining voice data of the first object in the virtual video space scene in response to the trigger operation on the dubbing control on the virtual display interface; and
determining the voice data of the first object as the object data applied to the multi-view video; and
playing a created video associated with the multi-view video on a virtual display interface, wherein
the created video is obtained by performing editing processing on the virtual video space scene based on the object data.

2. The method according to claim 1, wherein
the voice data of the first object comprises at least one of the following:
object voice data or background voice data; and
the obtaining voice data comprises:
displaying a dubbing mode list, wherein
the dubbing mode list comprises an object dubbing control and a background dubbing control; and
displaying a dubbable video object in response to a selection operation on the object dubbing control; and
the method further comprises:
determining a selected dubbable video object as a to-be-dubbed object in response to a selection operation on the dubbable video object, wherein
the dubbable video object is a video object presented in the multi-view video; and
obtaining, during playing of the multi-view video, the object voice data of the first object based on the to-be-dubbed object, and determining the object voice data as the object data; or
obtaining, during playing of the multi-view video in response to a selection operation on the background dubbing control, the background voice data of the first object, and determining the background voice data as the object data.

3. The method according to claim 2, wherein the obtaining the object voice data comprises:
performing muting processing on video voice data corresponding to the to-be-dubbed object;
displaying, when the to-be-dubbed object is in a vocalizing state, text information and sound track information that correspond to the video voice data;
obtaining the object voice data of the first object; and
determining the object voice data as the object data.

4. The method according to claim 2, further comprising:
performing, when the object data is the object voice data, replacement processing on video voice data corresponding to the to-be-dubbed object in the multi-view video by using the object voice data to obtain the created video; or
superimposing, when the object data is the background voice data, the background voice data to the multi-view video to obtain the created video.

5. The method according to claim 1, further comprising:
displaying an object invitation control on the virtual display interface;
displaying an object list in response to a trigger operation on the object invitation control, wherein the object list comprises an object in association with the first object; and
transmitting, in response to a selection operation on the object list, an invitation request to a target virtual reality (VR) device associated with a second object to enable the target VR device associated with the second object to display the virtual video space scene.

6. The method according to claim 5, wherein the transmitting an invitation comprises:
initiating the invitation request for the second object to a server to enable the server to transmit the invitation request to the target VR device associated with the second object, wherein
the target VR device displays the virtual video space scene in a case that the target VR device accepts the invitation request; and
the method further comprises:
displaying a target virtual object in an object virtual video picture when the target VR device accepts the invitation request and displays the virtual video space scene, wherein
the second object enters the virtual video space scene by using the target virtual object,
the target virtual object is associated with figure data of the second object, and
the object virtual video picture is used for presenting a virtual video space scene in a view of the first object.

7. The method according to claim 6, wherein
the scene editing operation comprises a trigger operation performed by the first object on a performance control on the virtual display interface; and
when the second object already triggers the performance control, the obtaining object data of a first object in the virtual video space scene in response to a scene editing operation on the virtual video space scene comprises:
displaying, in response to the trigger operation performed by the first object on the performance control on the virtual display interface, target object data corresponding to the target virtual object in the object virtual video picture, and
obtaining the object data of the first object in the virtual video space scene, wherein
the created video comprises a performance object associated with the first object and the target virtual object,
the performance object in the created video is presented based on the object data, and
the target virtual object in the created video is presented based on the target object data.

8. The method according to claim 1, further comprising:
displaying a shopping control on the virtual display interface;
displaying, in response to a trigger operation on the shopping control, an available virtual item according to a second display mode, wherein
the second display mode is different from a display mode of the available virtual item before triggering of the shopping control, and
the available virtual item is an item presented in the virtual video space scene;
determining a selected available virtual item as a to-be-purchased item in response to a selection operation on the available virtual item; and
displaying purchase information corresponding to the to-be-purchased item on the virtual display interface.

9. The method according to claim 1, further comprising:
displaying a master shot virtual video picture on the virtual display interface, wherein
the master shot virtual video picture is used for presenting a virtual video space scene in a master shot view;
displaying a moving view switching control on the virtual display interface;
obtaining, in response to a trigger operation on the moving view switching control, a view of the first object after movement for the virtual video space scene as a moving view; and
switching displaying of the master shot virtual video picture to a moving virtual video picture of the virtual video space scene in the moving view.

10. The method according to claim 1, further comprising:
displaying a master shot virtual video picture of the virtual video space scene in a master shot view on the virtual display interface;
displaying a fixed-point view switching control on the virtual display interface;
displaying a fixed-point cursor on the virtual display interface in response to a trigger operation on the fixed-point view switching control;
obtaining, in response to a movement operation on the fixed-point cursor, a view of the fixed-point cursor after movement for the virtual video space scene as a fixed-point view; and
switching displaying of the master shot virtual video picture to a fixed-point virtual video picture of the virtual video space scene in the fixed-point view.

11. A data processing apparatus, comprising:
a memory storing a plurality of instructions; and
a processor configured to execute the plurality of instructions, wherein upon execution of the plurality of instructions, the processor is configured to:
display, in response to a trigger operation on a multi-view video, a virtual video space scene corresponding to the multi-view video;
obtain object data of a first object in the virtual video space scene in response to a scene editing operation on the virtual video space scene, wherein the first object is an object that initiates the trigger operation on the multi-view video;
play a created video associated with the multi-view video on a virtual display interface, wherein the created video is obtained by performing editing processing on the virtual video space scene based on the object data;
display an object invitation control on the virtual display interface;
display an object list in response to a trigger operation on the object invitation control, wherein the object list comprises an object in association with the first object; and
transmit, in response to a selection operation on the object list, an invitation request to a target virtual reality (VR) device associated with a second object to enable the target VR device associated with the second object to display the virtual video space scene.

12. A data processing method performed by a computer device, comprising:
displaying, in response to a trigger operation on a multi-view video, a virtual video space scene corresponding to the multi-view video;
obtaining object data of a first object in the virtual video space scene in response to a scene editing operation on the virtual video space scene, wherein the first object is an object that initiates the trigger operation on the multi-view video, wherein the scene editing operation comprises a trigger operation on a performance control on the virtual display interface, and wherein the obtaining object data of the first object comprises:
playing the multi-view video; and
obtaining posture data and figure data of the first object in the virtual video space scene in response to the trigger operation on the performance control on the virtual display interface, and determining the posture data and the figure data as the object data applied to the multi-view video, wherein
the created video comprises a performance object associated with the first object, and the performance object in the created video is presented based on the posture data and the figure data; and
playing a created video associated with the multi-view video on a virtual display interface, wherein
the created video is obtained by performing editing processing on the virtual video space scene based on the object data.

13. The method according to claim 12, wherein the obtaining posture data and figure data of the first object in the virtual video space scene and determining the posture data and the figure data as the object data comprises:
displaying a performance mode list, wherein
the performance mode list comprises a character replacement control and a character creation control; and
displaying a replaceable video object in response to a trigger operation on the character replacement control;
determining a selected replaceable video object as a character replacement object in response to a selection operation on the replaceable video object, wherein
the replaceable video object is a video object presented in the multi-view video; and
obtaining, during playing of the multi-view video, the posture data and the figure data of the first object based on the character replacement object, and determining the posture data and the figure data as the object data; or
obtaining, during playing of the multi-view video in response to a trigger operation on the character creation control, the posture data and the figure data of the first object, and determining the posture data and the figure data as the object data.

14. The method according to claim 13, further comprising:
canceling, when the object data is obtained by triggering the character replacement control, displaying of the character replacement object in a performance-view video, and fusing the performance object that complies with performance object data into the performance-view video to obtain the created video, wherein
the performance-view video is obtained by shooting the virtual video space scene in a performance view during playing of the multi-view video after triggering of the performance control, and
the performance object data is data presented by the object data in the performance view; or
fusing, in a case that the object data is obtained by triggering the character creation control, the performance object that complies with performance object data into a performance-view video to obtain the created video.

15. The method according to claim 13, wherein the displaying a replaceable video object in response to a trigger operation on the character replacement control and determining a selected replaceable video object as a character replacement object in response to a selection operation on the replaceable video object comprises:
  determining, in response to the trigger operation on the character replacement control, a video object currently displayed in an object virtual video picture as the replaceable video object; and
  displaying, in response to a marking operation on the replaceable video object, a marked replaceable video object according to a first display mode, wherein
    the first display mode is different from a display mode of a video object other than the replaceable video object; and
  determining the marked replaceable video object as the character replacement object, wherein
    the object virtual video picture is used for presenting a virtual video space scene in a view of the first object.

16. The method according to claim 13, wherein the displaying a replaceable video object in response to a trigger operation on the character replacement control and determining a selected replaceable video object as a character replacement object in response to a selection operation on the replaceable video object comprises:
  displaying at least one video clip corresponding to the multi-view video in response to the trigger operation on the character replacement control;
  displaying a video object in a selected video clip in response to a selection operation on the at least one video clip;
  determining the video object in the selected video clip as the replaceable video object;
  displaying, in response to a marking operation on the replaceable video object, a marked replaceable video object according to a first display mode, wherein
    the first display mode is different from a display mode of a video object other than the replaceable video object; and
  determining the marked replaceable video object as the character replacement object.

17. The method according to claim 12, further comprising:
  displaying a mirror preview control on the virtual display interface during obtaining of the posture data and the figure data of the first object; and
  displaying a performance virtual video picture in a performance preview region on the virtual display interface in response to a trigger operation on the mirror preview control, wherein
    the performance virtual video picture comprises the performance object fused into the virtual video space scene.

18. The method according to claim 12, further comprising:
  displaying a figure customization list on the virtual display interface;
  updating, in response to completing a configuration operation on the figure customization list, the figure data according to figure data that is configured to obtain configured figure data, wherein
    the configured figure data comprises clothing data, body shape data, voice data, and appearance data; and
  displaying the performance object in the created video by using a performed action and a performance figure, wherein
    the performed action is determined based on the posture data of the first object, and
    the performance figure is determined based on at least one of the clothing data, the body shape data, the voice data, and the appearance data.

19. The method according to claim 13, further comprising:
  displaying a replacement transparency input control for the character replacement object on the virtual display interface;
  obtaining input transparency information for the character replacement object in response to an input operation on the replacement transparency input control;
  performing transparency update displaying on the character replacement object on the virtual display interface according to the input transparency information; and
    displaying a position cursor of the character replacement object after transparency update in the virtual video space scene.

* * * * *